United States Patent [19]

Bonadio

[11] Patent Number: 5,189,633
[45] Date of Patent: Feb. 23, 1993

[54] APPARATUS AND METHOD FOR INTERACTIVELY MANIPULATING MATHEMATICAL EQUATIONS

[76] Inventor: Allan R. Bonadio, 562 Shoreline Hwy., Mill Valley, Calif. 94941

[21] Appl. No.: 841,851

[22] Filed: Feb. 26, 1992

Related U.S. Application Data

[63] Continuation of Ser. No. 604,550, Oct. 26, 1990, abandoned, which is a continuation-in-part of Ser. No. 463,740, Jan. 12, 1990, abandoned.

[51] Int. Cl.$^5$ .................. G06F 3/00; G06F 15/32
[52] U.S. Cl. .................. 364/709.12; 364/735
[58] Field of Search .................. 364/709.01, 709.12, 364/710.11, 706, 709.06, 709.14, 735

[56] References Cited

U.S. PATENT DOCUMENTS

| | | | |
|---|---|---|---|
| 4,845,652 | 7/1989 | Bunsen | 364/709.14 |
| 4,852,057 | 7/1989 | Patton | 364/709.06 |
| 4,885,714 | 12/1989 | Eisenstein et al. | 364/709.01 |

OTHER PUBLICATIONS

Arnon, Dennis et al., draft of "CaminoReal: An Interactive Mathematical Notebook," 1987, Xerox Corporation.

Soiffer, Neil M., "The Design of a User Interface for Computer Algebra Systems," Apr., 1991, Univ. of California, Berkeley.

"User's Guide" for Milo The Math Processor for the Macintosh, Paracomp, Nov., 1988.

*Primary Examiner*—Long T. Nguyen
*Attorney, Agent, or Firm*—Townsend and Townsend

[57] ABSTRACT

A method and apparatus for providing an interactive mathematical manipulation methodology on a computer system. Equation manipulation and derivation as performed by a person using pencil and paper are simulated. The user enters an equation and performs mathematical manipulations by moving expression elements on the display. Features are included for maintaining the truth of expressions input by a user, simultaneously editing a multiplicity of equations, outlining expression elements, isolating a particular element in an equation, substituting one equation into another, and providing simplified parentheses rules.

64 Claims, 14 Drawing Sheets
Microfiche Appendix Included
(16 Microfiche, 1558 Pages)

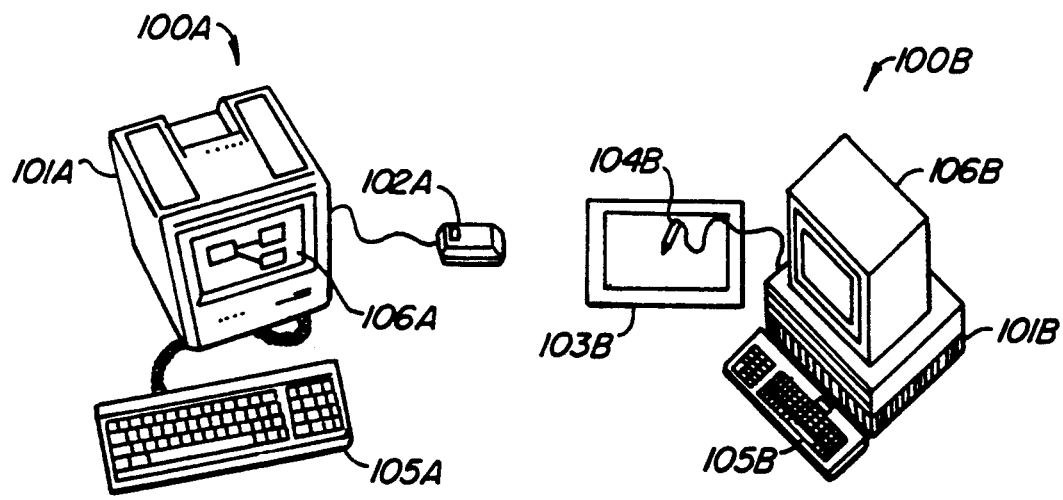
FIG. 1A.
PRIOR ART
FIG. 1B.
PRIOR ART
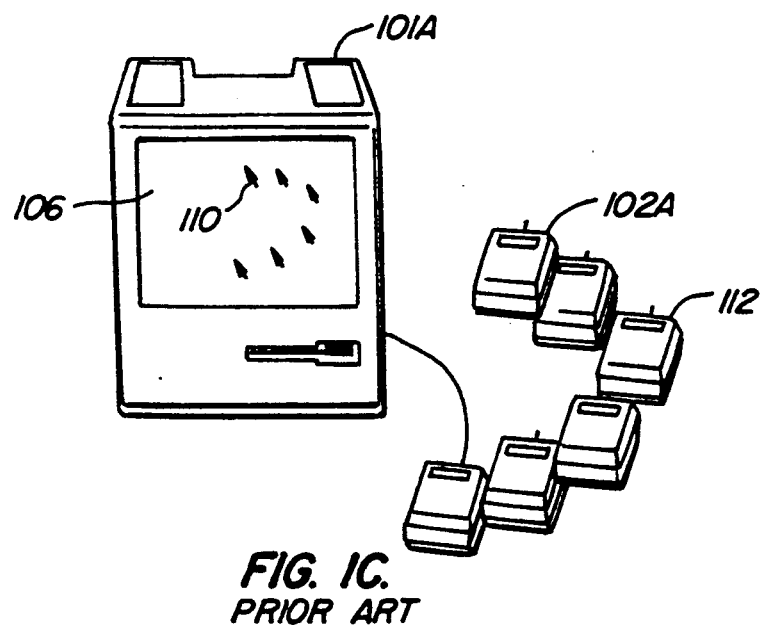
FIG. 1C.
PRIOR ART
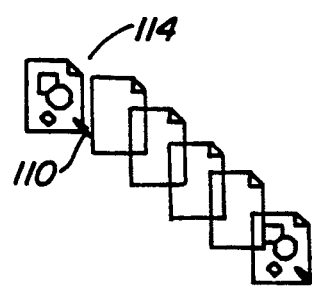
FIG. 1D.
PRIOR ART QLogarithms .......... ~605
602~QTrigonometry
    QFunction Declarations ⌐604
601~QTrig rules
      Qbasic identities
603 { Qtransform to/from Basic trigs
      Qtrig Addition
      Qtrig Multiplication
603 { Qmultiple-of-argument identities
      Qtransform squares of trigs
QHyperbolic .......... ⌐606
QComplex Transcendental Identities ~605

*FIG. 6A.*

QLogarithms
QTrigonometry
    QFunction Declarations
    QTrig rules
        Qbasic identities
        Qtransform to/from Basic trigs
        Qtrig Addition
        Qtrig Multiplication
            ■upon [Transform] transform $\cos(y)\sin(x)$ into $1/2(\sin[x-y] + \sin[x+y])$
            ■upon [Transform] transform $\cos(x)\cos(y)$ into $1/2(\cos[x-y] + \cos[x+y])$
            ■upon [Transform] transform $\sin(x)\sin(y)$ into $1/2(\cos[x-y] - \cos[x+y])$
            ■upon [Transform] transform $(\cos[x])^2$ into $1/2(\cos[2x]+1)$
            ■upon [Transform] transform $(\sin[x])^2$ into $1/2(-\cos[2x]+1)$
        Qmultiple-of-argument identities
        Qtransform squares of trigs
QHyperbolic
QComplex Transcendental Identities

*FIG. 6B.*

$$\triangle y = \frac{7x-7}{x^2-3x+2} + x + 3$$

$$\triangle y = \frac{\frac{1}{(x-1)}(7x-7)}{\frac{1}{(x-1)}(x^2-3x+2)} + x + 3$$

FIG. 7.

$$\square y = \begin{bmatrix} \frac{x}{3y+\boxtimes} & \frac{x}{3y+\boxtimes} & \frac{x}{3y+\boxtimes} \\ \frac{x}{3y+\boxtimes} & \frac{x}{3y+\boxtimes} & \frac{x}{3y+\boxtimes} \\ \frac{x}{3y+\boxtimes} & \frac{x}{3y+\boxtimes} & \frac{x}{3y+\boxtimes} \end{bmatrix}$$

FIG. 8.

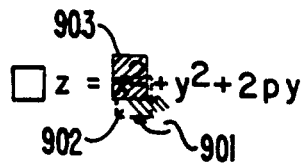
FIG. 9A.
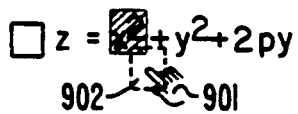
FIG. 9B.
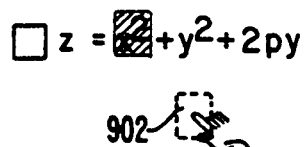
FIG. 9C.
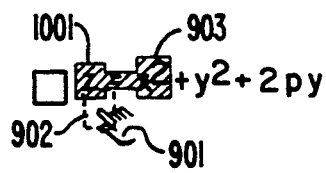
FIG. 10A.
$$\square\, z = x^2 + y^2 + 2py$$
$$\triangle\, -x^2 + z = y^2 + 2py \;\longleftarrow 1002$$
FIG. 10B.
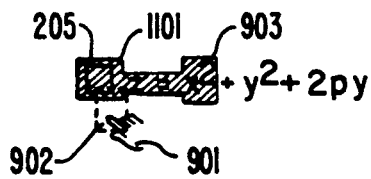
FIG. 11A.
$$\square\, z = x^2 + y^2 + 2py$$
$$\triangle\, x^2 = -y^2 - 2py + z \;\longleftarrow 1102$$
FIG. 11B.

FIG. 12B.
☐ $z = x^2 + y^2 + 2py$
△ $z = (\cos[\theta]+1)^2 + x^2 + 2py$ ← 1205
☐ $y = 1 + \cos(\theta)$

FIG. 12D.
☐ $z = x^2 + y^2 + 2py$
△ $z = (\cos[\theta]+1)^2 + 2(\cos[\theta]+1)p + x^2$ ← 1209
☐ $y = 1 + \cos(\theta)$

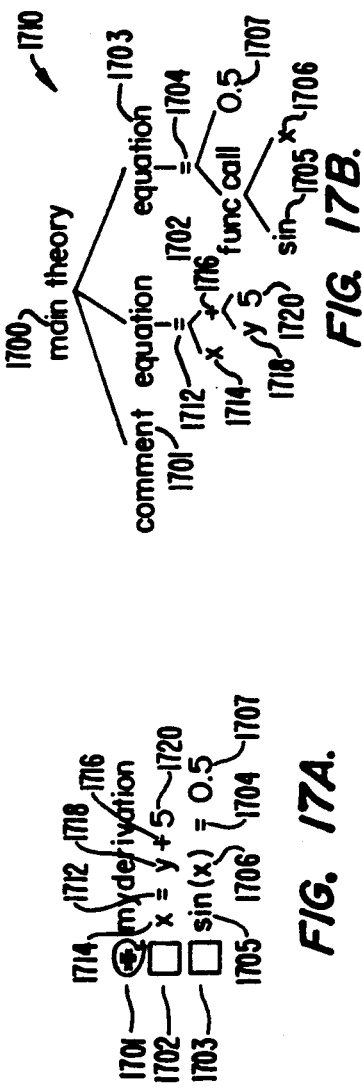

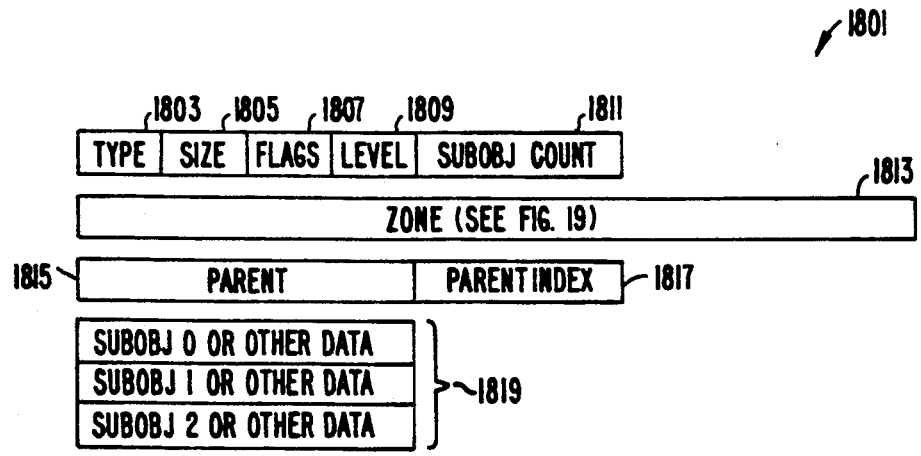

FIG. 18A.

```
TYPEDEF STRUCT OBJ
{
1803~BYTE TYPE; /*THE TYPE OF THIS OBJ*/
1805~BYTE SIZE; /*IMPLIED FONT SIZE AT THIS LEVEL (EQUATIONS ONLY)*/
      BOOL SIZED:1; /*CLEAR THIS TO "INVALIDATE" IT.*/
      BOOL DRAWN:1; /*SET BY INVALIDATE ROUTINE, SAYS THIS WAS CHANGED
                AND NEEDS DRAWING REGARDLESS OF SIZE.*/
      BOOL FILLERX:1;
1807~ BOOL MAYBECOLLAPSE:1; /*TRUE=THIS OBJ IS FRESH; COLLAPSE IF TOO BIG.*/
      BOOL COLLAPSED:1; /*ARE SUBORDINATE PROPS DISPLAYED ON THE SCREEN?(PROPS ONLY)*/
      BOOL HIDDEN:1; /*IS THIS PROP HIDDEN FOR ANY OUTLINING REASON? IF SO, THIS IS ON.
                AND, THIS AND ALL SUBOBJS ARE NOT DRAWN, SIZED, ETC.*/
      BYTE PARENSTYLE:2; /*KIND OF PARENS WE USE (EQUATION OBJS ONLY)*/
1809~BYTE LEVEL; /*OUTLINE LEVEL, 0-250; 255=ON SAME LINE (PROPS ONLY)*/
1811~SHORT COUNT; /*COUNT OF OWNED SUBNODES*/
1813~ZONE WHERE; /*REMEMBER WHERE THIS IS DRAWN*/
      STRUCT OBJ **PARENT; /*THE PARENT OF THIS OBJ (NULL IF TOP LEVEL)*/
      SHORT PARENTINDEX; /*OUR OWN INDEX IN OUR PARENT OBJECT*/
      UNION
      {
        /*EQUATION TYPES*/
        OBJ **SUBOBJ[];
1819~   INTEGER INTVAL;            } FIELDS
        REAL REALVAL;
        BYTE STRVAL [VALLEN];
      }DATA;
};
```

FIG. 18B.

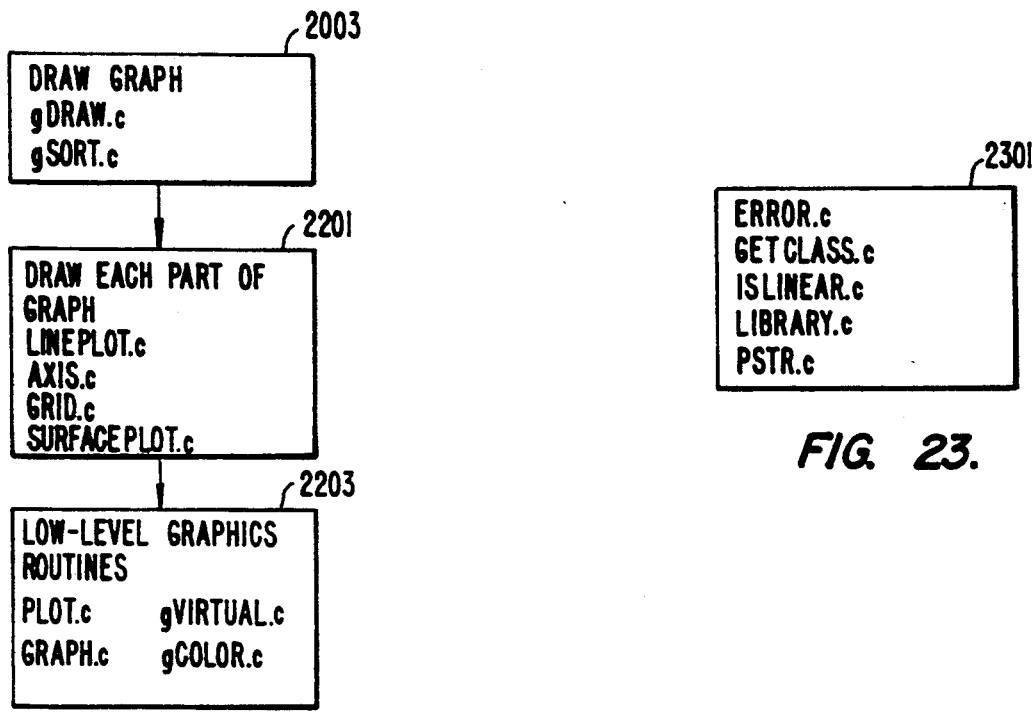
FIG. 22.
FIG. 23.
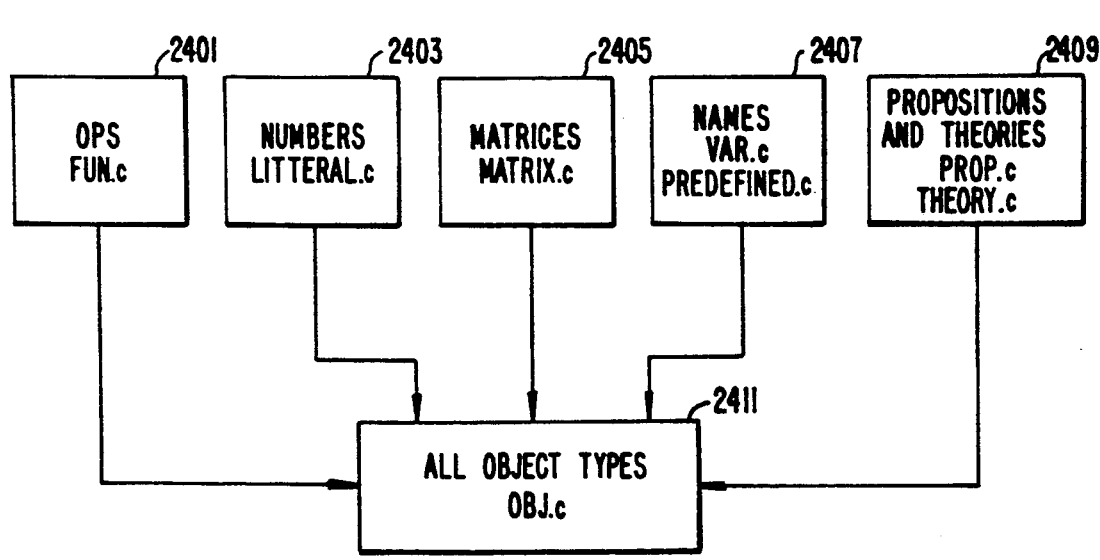
FIG. 24.

APPARATUS AND METHOD FOR INTERACTIVELY MANIPULATING MATHEMATICAL EQUATIONS

This is a continuation of application Ser. No. 07/604,550 filed Oct. 26, 1990, now abandoned which is a continuation-in-part of Ser. No. 07/463,740, filed Jan. 12, 1990, now abandoned.

MICROFICHE APPENDIX

A microfiche appendix of 16 sheets, 1558 pages, containing c language source code for a preferred embodiment, has been filed herewith.

Notice Regarding Copyrighted Material

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

The present invention relates generally to the manipulation of mathematical expressions and equations. More particularly, the invention is related to an apparatus for displaying and manipulating expression elements and equations in mathematical form.

Systems for manipulating mathematical expressions and equations typically take the form of an interactive methodology running on a computer in which commands are entered on a keyboard to appear on a display screen. One such methodology permits the entry of an expression such as:

$$\text{diff}(\sin(\ln(x^2+1)/3), x);$$

After the "diff" (differentiate) command is performed, the result is:

$$2/3 \frac{x \cos(1/3 \ln(x^2+1))}{x^2+1}$$

As can be seen from the above, the user must type in a command (diff) in front of the expression for the system to perform an operation on the expression. This is inconvenient and does not permit the user to directly interact and understand the derivational steps performed by the system.

A convention which has developed in many of the prior art mathematical manipulation systems is an operation which "evaluates" an expression. For example, if a user wants to expand an expression such as $(x+1)^3$, he might enter a command such as "expand$((x+1)^3)$;". The "expand" function takes a symbolic expression and generates an equivalent expression which is displayed in an expanded form. Many such operations are provided by the system, some generating equivalent expressions and some generating completely different expressions. For example, the solution of a system of two linear equations may involve the entry of an expression such as:

$$\text{solve}(\{a=b+2, b+a=t\}, \{a, b\});$$

In response, the system generates an expression which solves for the variables a and b. A generated response may look like:

$$\{a=t/2+1, b=t/2-1\}$$

Strictly speaking, both the input and output expressions are understandable equations which represent a mathematical derivation. However, a person using the system to generate the response does not get an understanding of how the derivation stepped from the input equations to the generated response.

Symbolic algebra methodologies have inherited many concepts from simpler math methodologies and interactive programming languages. For example, a user may assign symbolic values to variables and set up the previous "solve" command in the following way:

$$eq1 := a = b+2;$$

$$eq2 := b+a = t;$$

$$\text{solve}(\{eq1, eq2\}, \{a, b\});$$

In this set of expressions, variables eq1 and eq2 are assigned symbolic expressions for equations which are subsequently substituted into any equation in which they occur. For some purposes, it may be desirable to prevent the mathematical system from expanding variables until a later point in time. In this case, the variable name may be prefixed with a quotation mark or enclosed in another function. For more subtle situations, it may be necessary to perform a variety of other functions to control the exact timing of the substitution. The result which is initially desired becomes more and more complicated to obtain.

A variety of other mathematical manipulation systems have been developed. Some of the other problems present in these systems are that the arrangement of equations is in the sequential form of a word processor rather than the hierarchial form of an outliner. It is difficult for a user to hide unwanted conclusions and/or results. Another difficulty which presents itself in a mathematical manipulation system is that a particular operation on an equation is performed upon depression of a key which would not be the natural selection of a user first using the program. For example, in some systems the expression "(ab+da)/16x=4x" is modified by selecting the "a" and entering a command which modifies the equation to "a(b+d)/16x=4x." The "16x" can be selected and moved to the right side of the equation by inputting a second command. This technique has the disadvantage of requiring many commands to achieve a resulting equation particularly when working with large expressions. Further, this system does not generate conclusions and there is no automatic generation of a sequence of steps.

Many disadvantages exist with respect to the solution of mathematical problems through computer based mathematical manipulation systems. One problem which is widely attributed to such systems is the lack of facilities for arranging the results of derivations. Another difficulty which is commonly experienced is the inability to select and work with individual elements of an expression.

Other disadvantages contained in previous mathematical manipulation systems are the inability to use greek letters, the necessity for a multiply symbol (usually in the form of a star, rather than the ability to place symbols adjacent one another), and the awkward recognition and use of a variety of parentheses symbols.

SUMMARY OF THE INVENTION

The present invention is a method and apparatus for providing a programmed computer system to perform mathematical manipulations. The invention permits a user to interact with the system in a manner which closely assimilates mathematical derivations and manipulations as they would be performed using pencil and paper. An equation or group of equations is initially typed in by a user on a keyboard. The equation or equations are displayed on the screen and the user manipulates various expression elements and equations by pointing to and identifying a particular element to be manipulated. Pointing is typically carried out through the use of a mouse or similar input device connected to the computer.

Once a particular element has been selected for manipulation, it is moved to a desired spot in the equation or in one of the other input equations and the system provides a modification of that equation in accordance with the manipulation. The result of the manipulation is displayed on the next line and then the process may be repeated to further manipulate the new equation.

In a preferred embodiment, equations are presented in an outline format. More than one set of inconsistent equations may be in use at a given time. Equations in one theory are consistent, but equations in competing theories may conflict. This is because each represents a different hypothesis. Manipulations may be performed on any of the entered theories. However, the theories are maintained separately to preserve the truthfulness of each theory.

In a preferred embodiment, a user may manipulate mathematical expressions and equations in a natural manner. Further, the system simplifies the use of parentheses by accepting parentheses input by the user and interpreting and converting them in accordance with a preselected standard for parentheses use. Therefore, the user need not be concerned with which parentheses closure is used.

Another aspect of a preferred embodiment of the present invention is the ability to simultaneously edit more than one expression. This feature is particularly useful in creating matrices. An entry may be duplicated to provide a group of matrix entries and then the resulting entries may be edited simultaneously.

A further aspect of a preferred embodiment of the present invention provides a multiplicity of resulting equations in response to a manipulation which has more than one possible result. The resulting equations are displayed and considered as separate and independent theories on which the user may perform new manipulations.

Still another feature of a preferred embodiment of the present invention is the ability to display a long equation in a form with which the user can work. For example, if an equation contains twenty expression elements which are to be added together, these elements may be displayed in a collapsed form so that they appear on the screen as a symbol rather than in expanded form. The user may then move through the equation displaying each expression element independently or in smaller groups.

For a more complete understanding of the nature and advantages of the invention, reference should be made to the ensuing detailed description taken in conjunction with the accompanying drawings.

BRIEF DESCRIPTION OF THE DRAWINGS

FIGS. 1A and 1B illustrate computer systems with which a mathematical manipulation methodology may be used;

FIGS. 1C and 1D are diagrams showing the use of a mouse with a computer;

FIG. 6 shows the use of an outliner;

FIG. 7 is a representation of multiple selections used for simultaneously applying a factor to the numerator and denominator of a fraction;

FIG. 8 represents multiple selections for simultaneously entering multiple elements in a matrix;

FIG. 9 is the beginning of a mathematical manipulation performed by pointing to an expression element and moving it to a new destination;

FIG. 10 is a transfer operation performed on an expression element to move it from one side of an equation to the other;

FIG. 11 is an isolation operation performed on a particular expression element on one side of an equation;

FIG. 15 is an equation in collapsed form;

FIG. 16 is an equation in partially collapsed form;

FIG. 17 is an equation and its internal representation as viewed by a mathematical manipulation methodology;

FIG. 18 is a diagram of the fields in an "object" structure and a source code listing of a declaration;

FIG. 22 is a more detailed block diagram of the manipulation block of FIG. 21;

FIG. 23 is a more detailed block diagram of the draw graph block of FIG. 21;

FIG. 24 is a block diagram of routines which may be called from any other block shown in FIGS. 21-23.

DETAILED DESCRIPTION OF THE DRAWINGS

FIG. 1A is a diagram showing the configuration of a typical computer system on which a mathematical manipulation methodology is implemented. Computer system 100A includes a bit-mapped display screen 106A, an alphanumeric keyboard 105A preferably including modifier keys for use in entering Greek and other symbols and equations, and a "mouse" 102A for pointing to a location on the screen.

The movement of mouse 102A causes the movement of a symbolic pointer on display screen 106A. The pointer may be moved to various places on the screen. A button 112 on mouse 102A is depressed and released causing commands to be executed by the mathematical manipulation program.

An alternative embodiment is shown in FIG. 1B. In this embodiment, mouse 102A is replaced with a graphics tablet 103B which is used in conjunction with an electronic pen 104B. When the tip of pen 104B contacts the surface of graphics tablet 103B, a signal is sent to computer 101B for processing. Pen 104B permits a user to point to and move objects displayed on tablet 103B. A variety of other pointing devices would function equally well.

FIG. 1C shows the use of mouse 102A in conjunction with computer 101A. As mouse 102A is rolled along a surface, a pointer 110 moves responsively on screen 106. Two fundamental uses for mouse 102A are clicking and dragging. Clicking is accomplished by moving pointer 110 onto an object on screen 106. Button 112 on mouse 102A is depressed and the computer responds if appropriate. Dragging is more complicated. After depressing button 112, as mouse 102A is rolled along a surface, the pointer moves on the screen as an animated depiction of some user action is drawn on the screen. For example, one common use for dragging is to allow the user to move and rearrange graphical icons. The user moves the pointer over an icon and depresses the mouse button. As mouse 102A is rolled along the surface, the object selected is dragged along with it. This function is shown in FIG. 1D wherein object 114 has been selected and is dragged along with pointer 110 to a new destination. This is similar to how it works on a graphics tablet.

In a preferred embodiment, the mathematical manipulation methodology of the present invention runs on an Apple Macintosh personal computer. The Apple Macintosh is easily adapted for use with the present invention because it includes a mouse and has the screen display capabilities necessary for use with the present invention. However, it should be understood that a variety of other computer systems could be adapted for use with the present invention.

Figure 2:
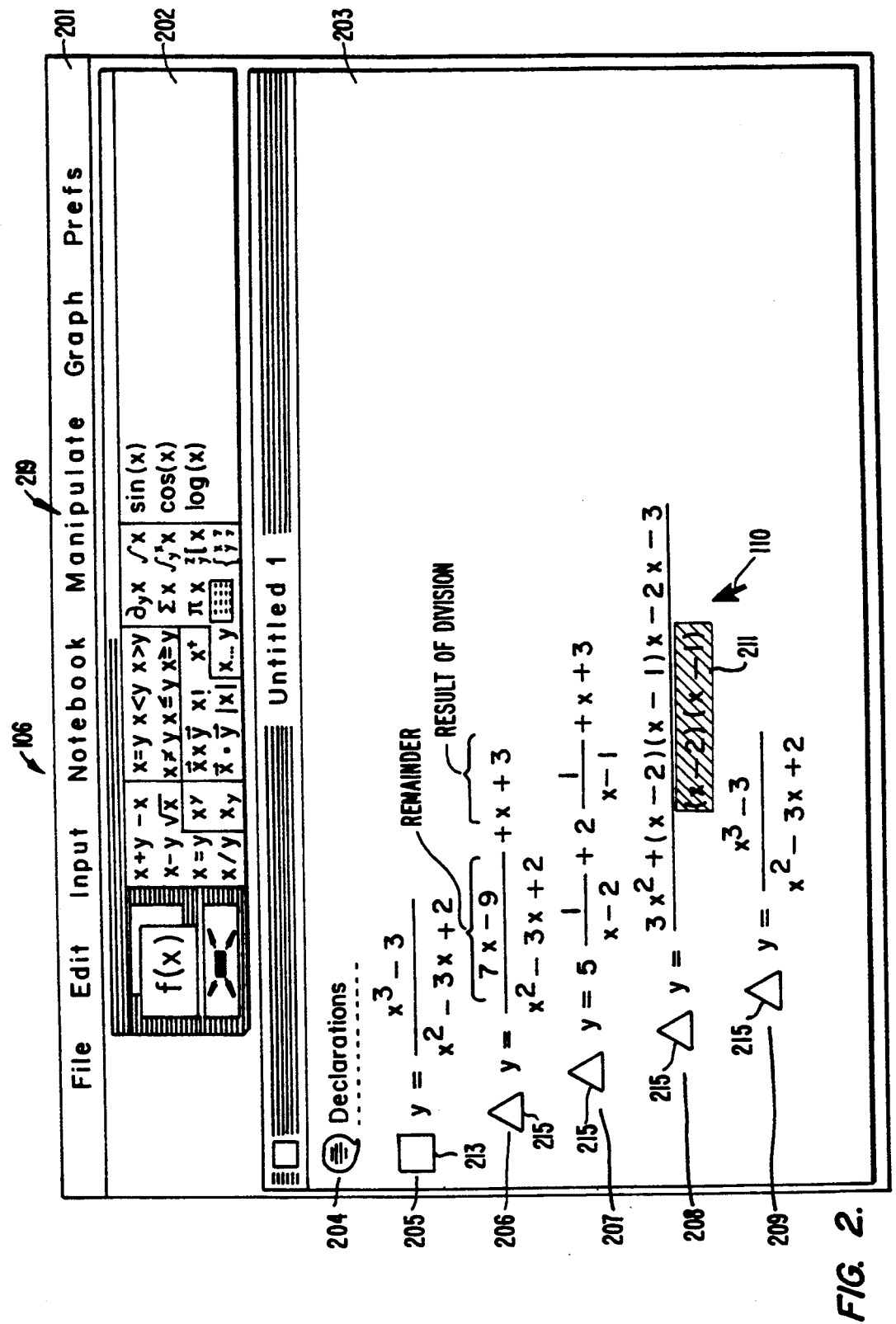
FIG. 2 is a derivation performed by a mathematical manipulation methodology.

FIG. 2 shows a sample mathematical derivation performed and displayed on display screen 106. A group of commands are displayed in menu bar 201. Each of these commands can be selected through use of mouse 102A at which time further instructions become available. A notebook window 203 occupies a large portion of display screen 106. Notebook window 203 is the location of expression elements and equation manipulation. Such manipulations are shown in lines 205-209 wherein an initial equation 205 was entered and through a series of manipulations 206-208, a resulting equation 209 was derived.

Other features of display screen 106 show a palette 202 which contains a group of functions useful in constructing equations in notebook window 203. The functions of palette 202 are activated through the use of mouse 102A in conjunction with keystrokes input on keyboard 105. For example, the entry of equation "a=5/7" is accomplished by typing "a" on keyboard 105 and activating the function "x=y" to obtain the "=" structure. The function "x/y" is selected and a fraction is obtained for the right side of the equation. The user may then type a "5" on keyboard 105 and move pointer 110 to the denominator of the fraction and click, and then type a "7" on keyboard 105. An alternative technique for obtaining an equation in notebook window 203 is to simply type "a=5/7."

Once a user has typed in initial equation 205, manipulations may be commenced. The manipulations shown in notebook window 203 will now be explained. The user enters initial equation 205. An "Expand" command is performed on equation 205 to reach equation 206. Polynomial division is accomplished by selecting "Expand" from "manipulate" menu 219 which is retrieved by selecting "manipulate" 219. In equation 206, the numerator, $x^3-3$, has been divided by the denominator, $x^2-3x+2$. The result of this division is "x+3" with a remainder of "$(7x-9)/(x^2-3x+2)$." Equation 207 was obtained by performing a "partial fraction decomposition" command on the first expression element on the right side of equation 206. In this case, the remainder "$(7x-9)/(x^2-3x+2)$" is the subject of the partial fraction decomposition. The system carries out partial fraction decomposition by internally performing the following steps. First, the denominator is reduced to "$(x-2)(x-1)$." Next, the term "$(7x-9)/((x-2)(x-1))$ is set equal to the standard formula "$a/(x-2)+b/(x-1)$." Solving for "a" and "b" yields the result shown in equation 207. Equation 208 was obtained by instructing the system to perform a "collect" command. This instruction was accomplished by moving pointer 110 onto the right hand side of equation 207 and dragging mouse 102 over the whole sum. This selects the sum. Each element in the expression is multiplied by "$((x-2)(x-1))/((x-2)(x-1))$." Finally, by expanding both numerator and denominator of the fraction in equation 208 the initial equation 205 is obtained as resulting equation 209. One such selection 211 is shown.

Line 204 is reserved for declarations. Declarations are statements which define variables and provide comments made up of simple descriptive text. These declarations are peripheral to the main function of the program.

All entries are made in the form of an equation. If a user enters an expression without an equal sign and performs a manipulation upon that expression, the result is an equation equating the original expression to the new result. For example, if the user enters "x+x" and performs a manipulation on it, the system will simplify it to "2x" and will provide a resulting equation: x+x=2x.

The feature for providing an equation upon entry of expression elements is useful because it guides the user in a direction for completing a mathematical manipulation with respect to the full equation. It provides the user with an equation as opposed to an isolated result so as to track where the result came from in the derivation.

The system receives entries and provides a labeling scheme by which the user can identify the source of the equation later. For example, original equation 205 is preceded by a square icon 213 whereas each of the derived equations 206-209 is preceded by a triangular icon 215. Of course, the symbols could be changed as desired.

Once the user has entered an equation, the program keeps track of consistency between the equations. Therefore, it is unnecessary for a user to remember what a particular expression element is equal to.

Figure 3:
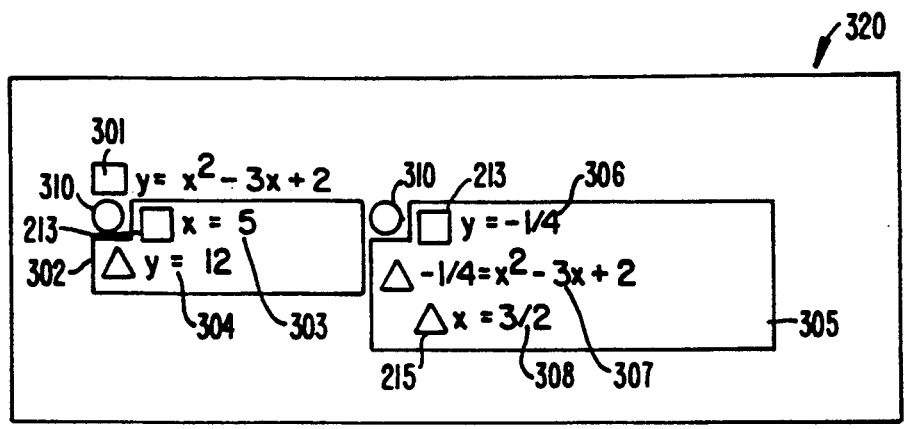
FIG. 3 shows a screen containing two independent theories.

FIG. 3 shows a screen display containing two independent and competing theories. Theories permit a user to segregate groups of equations which are true for a limited set of circumstances. In FIG. 3, a first theory 302 is independent from a second theory 305. The theories are indicated by circular icons 310. Within each theory, the user has typed an initial equation 303 indicated by square icon 213. Equation 301 is then combined with equation 303 by way of a substitute manipulation. This yields equation 304 wherein y=12.

In a second theory 305, y is set equal to "$-\frac{1}{4}$." Using equation 306 to substitute "$-\frac{1}{4}$" for y in equation 301 yields intermediate equation 307. Solving for "x" results in resulting equation 308.

Theories can be contained in other theories. For example, a sub-theory could be initiated within theory 302 which would define more values for other variables. A main theory 320 envelops everything in notebook window 203 in which theories 302 and 305 as well as equation 301 are embedded.

All of the equations within a particular theory are assumed to be true. In addition, each sub-theory implicitly inherits all of the equations within a theory in which it is contained. This explains how equation 301 is valid within theories 302 and 305.

A theory is more than simply a rectangle drawn on a screen segregating a set of equations. A theory consistently keeps track of valid statements made within that theory and it prevents the user from mixing equations from rival theories. For example, equation 301 can be combined with equations 303 and 304 or with equations 306 and 308. Further, equations 303 and 304 can be combined with each other and with equation 301 but they cannot be combined with equations 306, 307 or 308 because those are contained within a competing theory. Equations from one theory can be combined with equations in a second theory only by copying an equation from one theory and specifically entering it within a competing theory (or outside of two sub-theories within a same theory) using equation editing commands.

Another advantageous use of theories is that they can be recognized by a variety of other functions. For example, one function which may access different theories is a function for calculating numerical values of expressions and finding information about various names. Such a function is useful in trying to calculate the value of "x" in theories 302 and 305.

A sub-theory always represents a more specific set of circumstances than the theory within which it is contained. For example, all of the equations contained in FIG. 3 are embedded in a larger theory 320. Outside of theory 320, "x" and "y" may have any values whatsoever with no relationship between them. Within theory 320, "x" and "y" are constrained by equation 301. If the value of either "x" or "y" is known, the value of the other is determined (or is constrained to two possible solutions). In each of the theories 302 and 305, a more specific constraint exists such that the values of x and y are known.

Figure 4:
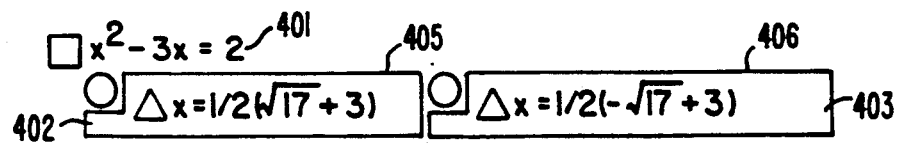
FIG. 4 shows two possible resulting equations as a solution to a previous equation.

FIG. 4 shows two resulting equations 402 and 403 as alternative solutions to equation 401. Each of the resulting equations 402 and 403 is contained within an independent competing sub-theory 405 and 406, respectively. In this case, equation 401 is a quadratic equation having two mutually exclusive solutions for "x." Each solution is represented in a separate and independent sub-theory. These sub-theories are generated automatically in response to a command initiated on equation 401, allowing a user to manipulate each of these solutions separately and to base independent derivations on each that are only valid for those circumstances. The system of the preferred embodiment includes an option for turning off the feature for generating all possible solutions as the solved equation becomes more complicated.

Figure 5:
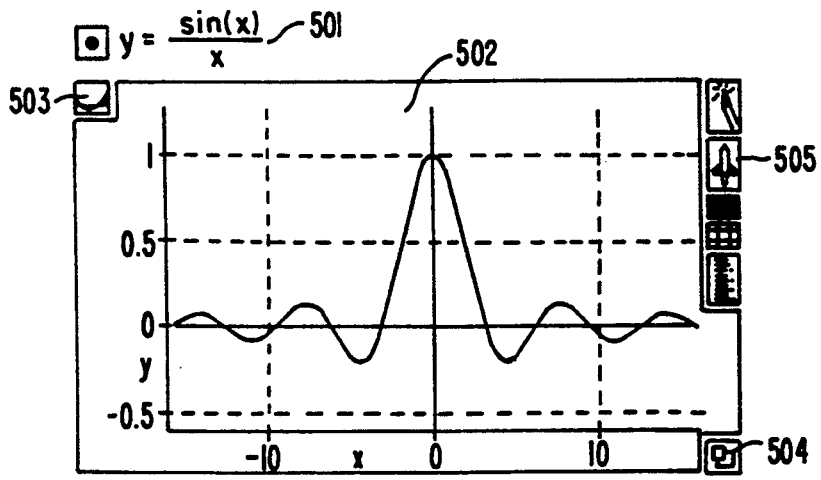
FIG. 5 is a graphic representation of an equation.

FIG. 5 shows a graphic representation of an equation. The graphing option is activated by selecting the graph instruction on menu bar 201 shown in FIG. 2. Equation 501 is used to calculate values for the graph displayed in window 502. At the perimeter of graph window 502 are a number of icons which represent labels and functions. Icon 503 is the graph icon distinguishing the graphing function from equations and comments. Icon 504 is a "size" function which is activated by mouse 102A for enlarging or reducing the graph window. Icon set 505 represents a set of functions to be performed on the graph within graph window 502. For example, these functions may include a slice function for taking a slice of the graph to look at in more detail, to zoom in or out, to increase or decrease resolution, or to manipulate the internal structure of the graph. Of course, other types of graphs are available such as semilog graphs, polar graphs and three dimensional graphs. It should be noted that the rule whereby expressions are kept in equations helps the user draw graphs as it forces the user to name both the x and the y axis.

FIGS. 6A and 6B show the use of an outliner to display information in a hierarchical form. A mother proposition 602 is set against the left margin. A daughter proposition 604 is then indented and daughter propositions 603 of daughter proposition 601 are further indented. Therefore, proposition 601 is the daughter of mother proposition 602 and has daughter propositions 603 of its own. Proposition 604 is a sibling and proposition 605 is an aunt of proposition 601. Propositions may be collapsed. In the collapsed form a row of dots or some other indicator is used to represent hidden portions. The number of dots relates to the number of propositions hidden in collapsed form, permitting a user to estimate the amount of material under a particular proposition. FIG. 6B shows a set of trigonometric multiplication propositions in expanded form which corresponds to the collapsed form shown in FIG. 6A. Rearrangement of propositions along with their associated daughter trees is performed similarly to algebraic manipulations.

The preferred embodiment includes a feature for selecting several unrelated expressions and editing them simultaneously. This may be accomplished by selecting the desired expressions with mouse 102A while a modifier key is held down in the keyboard and typing keystrokes on keyboard 105A. Each of the keystrokes entered on keyboard 105A is inserted into each of the selected expressions simultaneously.

FIG. 7 shows a fraction 701 in which the multiple selection feature is used to simultaneously apply a factor to a numerator 705 and a denominator 706. The common factor to be applied is the division of both numerator 705 and denominator 706 by the expression "$x-1$." An "apply" command is issued to simultaneously select numerator 705 and denominator 706 of fraction 701. The expression "$1/(x-1)$" is then entered on keyboard 105A and a new equation 702 is generated with a new factor "$1/(x-1)$" 703 divided out of both numerator 705 and denominator 706. A blinking cursor 704 appears in each of numerator 705 and denominator 706. Subsequent manipulations will yield a simpler result closer to the users derived destination.

FIG. 8 represents the use of the multiple selection feature for simultaneously entering multiple expression elements 802 into matrix 801. Insertion point 803 represents one of nine locations of the cursor on the screen at which point the user is entering the next keystroke.

FIG. 9 shows a mathematical manipulation initiated by pointing to an expression element, "$x^2$" 903 and moving it to a new destination. Expression element 903 is selected through the use of mouse 102A. Once selected, pointer 901 grabs expression element 903 and indicates that it has grabbed expression element 903 with an outlined box 902. Outlined box 902 can then be dragged to a new destination on the screen. Of course, outlined box 902 could take on many different forms including a depiction of expression element 903. Dragging expression element 903 to a new destination is an interim step in performing a mathematical manipulation. The new destination must place expression element 903 in an equation. For example, in FIG. 10, expression element 903 is grabbed and dragged with pointer 901 to the left side of equation 1001. In FIG. 10B, the manipulation has been completed and resulting equation 1002 is displayed.

FIG. 11A shows a specific example of the isolation feature included in the preferred embodiment. This feature permits a user to select expression element 903 and have it isolated on one side of equation 1101. This feature is initiated by dragging outline box 902 to the left of icon 205. Equation 1101 becomes highlighted indicating that expression element 903 should be released by releasing select button 112 on mouse 102A. In this case, equation 1102 results as shown in FIG. 11B.

The isolate feature is designed to turn an expression inside out, including generating special cases and arbitrary constants. The automatic generation of more than one resulting answer as described above with respect to FIG. 4 was an example of the isolate command, where the user selected both occurrences of the variable "x" and dragged them over the proposition icon.

Figure 12A:
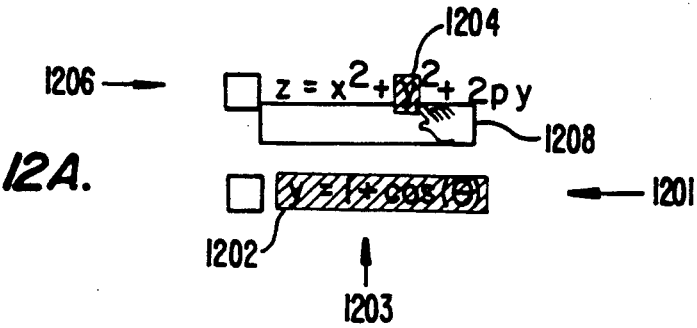
FIG. 12 is a substitution manipulation performed on an expression element defined in one equation to substitute it into a second equation.

FIGS. 12A and 12B illustrate a "substitute" manipulation in which an equation 1202 is substituted into a second equation 1206. In FIG. 12A, the entire equation 1201 is selected and substituted into equation 1206 as shown by outline box and pointer 1208. The result obtained is shown in FIG. 12B as equation 1205. The equations can be anywhere in window 203 as long as they are in the same theory. In other words, separate and independent competing theories cannot have their equations combined. There must a direct line of inheritance for the substitution to be allowed. If a substitution is attempted which is not permitted, no highlighting as shown for expression element 1204 will be indicated and no resulting equation 1205 will be generated.

Figure 12C:
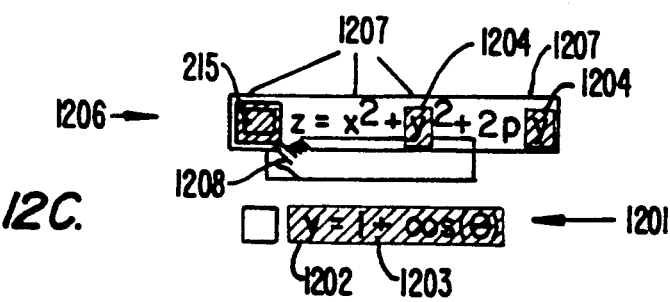

FIGS. 12C and 12D illustrate a variation of the substitute feature. In FIG. 12C, equation 1202 is substituted into equation 1206 in each of the places where the expression element 1204 is present. This global substitution feature is activated by dragging pointer 1208 over square icon 215 as shown in FIG. 12C. Upon substitution of equation 1201 into equation 1206, resulting equation 1209 is generated as shown in FIG. 12D.

It is possible that the target and pattern expressions will not be simple variables which match as in the cases shown in FIG. 12. In fact, they may be any expression at all. The preferred embodiment has special variables called "wild card variables" which will match any expression. Therefore, a pattern that contains wild card variables will match any expression that, from the outside, resembles the pattern expression.

The preferred embodiment allows a user to enter any of the three parentheses styles "( )", "[ ]", and "{ }" for any situation. Each of the parentheses styles is interpreted as being the same. The preferred embodiment receives the parentheses and converts to a predetermined standard which may typically be to alternate between the three. For example, the present invention recognizes that "sin" is a function, so if a user enters "sin(x)" or "sin{x}", there will be recognition that the user is attempting a function and not a multiplication of "sin" by "x." In this case, the "( )" parentheses will be displayed regardless of the type entered.

Vectors are represented by a list of expression elements separated by commas and enclosed in parentheses. If only one component is entered, it will be assumed that that component is a scalar. Upon entry of a comma, the program will display parentheses of the appropriate type around the vector.

Figure 13:
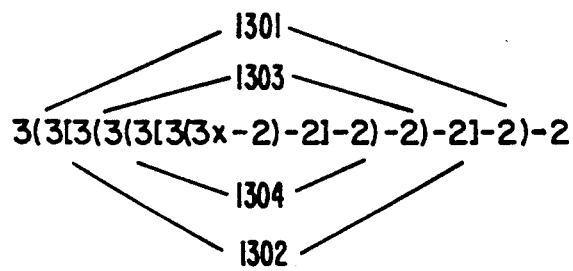
FIG. 13 shows an automatic parentheses feature.

If mismatched parentheses are entered, they are corrected when displayed on the screen. Parentheses will be added where necessary, without the user explicitly entering them. This is true when equations are built up with copy and paste functions to the point that they require parentheses. The system automatically chooses parentheses styles so that the three are alternated automatically as can be seen in FIG. 13. The choice of parentheses entered by the user is ignored and the alternating approach is used. This feature is particularly useful in the case where large, complex expressions are used.

Figure 14A:
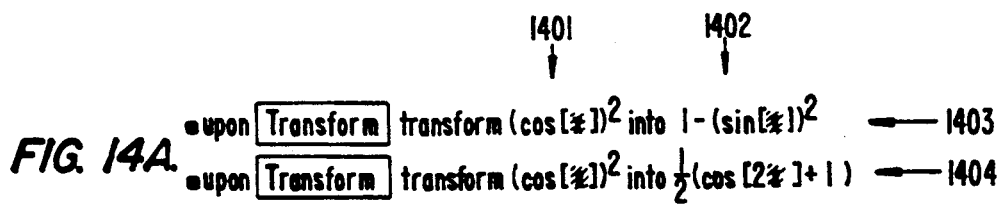
FIG. 14 is the transformation feature of a mathematical manipulation system.

FIG. 14 illustrates the transformation feature of the present invention. Two transformation rules 1403 and 1404 are shown. Rule 1403 has two expressions: a pattern expression 1401 and a replacement expression 1402. Assuming that these rules have been placed in the user's "notebook," when the user selects the transform command to be performed on an expression that matches pattern 1401, replacement expression 1402 will be substituted.

As with the substitute command, wild card variables can be used as shown. The difference between transform and substitute, is that with substitute, one pattern-replacement equation is specified. In the case of transform, a library is accessed which contains a group of transformation rules, typically including trigonometry and calculus identities, which are searched through to find a rule that matches a part of the expression. One such library is shown in the microfiche source code appendix named "standard rules and declarations."

Figure 14B:
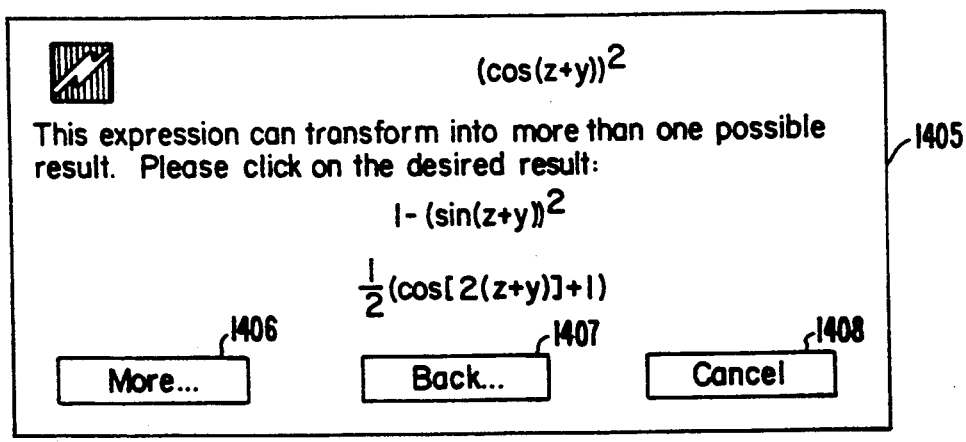

FIG. 14B shows the result of a transform command wherein the library contains two possible substitute expressions for one transform entry. The user is prompted to select one of the two expressions and upon selecting that expression through use of mouse 102A, the derivation continues. Of course, in the case where only one choice is available, the program continues the derivation without prompting the user. This scheme permits endless expansion of the rule database without burdening the user with more command and manipulation names and function descriptions. In the preferred embodiment, up to four alternative expressions can be displayed in window 1405 and if more have been entered, the user may click the "more" button 1406 to view additional expressions. The original expressions can be reaccessed by clicking on the "back" button 1407. A "cancel" button 1408 is also situated within window 1405 so that the user may cancel the transform command.

FIG. 15 shows how the system collapses an expression so that a user may see the format of the overall expression without having to see a long list of expression elements all at the same time. In this way, if an expression does not fit on the screen, it can be collapsed down to fit on the screen showing some or none of the expression elements. A group of commands are provided for exposing or collapsing particular expression elements. In FIG. 15, expression 1502 has been collapsed showing all of the expression elements as one ellipsis 1501. In a second line, part of the expression has been exposed, but the remainder is shown as ellipses 1503.

FIG. 16 shows an expression 1602 in an intermediate form of collapse. In this intermediate form only one of the terms 1605 is shown while the remainder of th expression elements before and after element 1605 are shown as ellipses 1603 and 1604, respectively. The user can select ellipses 1604 and choose the "expose" command which causes the previous term to be exposed and collapses the presently exposed term under 1603. In this way, the user can page through the entire equation one expression at a time. Similarly, the user can select ellipses 1603 and expose them to show the previous terms.

FIG. 17 shows an equation and its internal representation as viewed by the system of the preferred embodiment. An "object" is the fundamental data structure. The object includes numbers, variable references, operators (i.e., $+$, $-$, $\sqrt{}$, etc.), propositions, theories, graphs and plots inside of graphs. Each object contains zero or more pointers to other objects. In a preferred embodiment, a pointer is a handle which is a pointer to a pointer. Objects are dynamically allocated through the computer's operating system. The software used in the preferred embodiment is written in the C programming language.

In FIG. 17A, each notebook (203, FIG. 2) contains one tree of objects, the top level or root object being the main theory. Alternate implementations may represent a notebook as directed acyclic graphs which are a modification of the tree where a given child may be shared among several parent objects. FIG. 17B shows the internal structure of a theory. A main theory 1700 is shown as the root of tree 1710. A comment 1701 makes up one branch while equations 1702 and 1703 make up a second and third branch, respectively. Equation 1702 is built around "=" 1712. On one side of "=" 1712 is an "x" 1714. On the other side of "=" 1712 is a "+" 1716 which adds together further branch elements "y" 1718 and "5" 1720. Equation 1703 is structured similarly. "=" 1704 has two branches representing either side of that equal sign. On one side is a functional call which is made up of "sin" 1705 and the object of that sine function "x" 1706. On the other side of "=" 1704 is the value "0.5" 1707.

The grouping of the several different kinds of objects present in the preferred embodiment is as follows. First, there are expression objects which are used in expressions. They contain sub-objects which are also expressions. The "leaves" make up the expressions having no subexpressions such as literal numbers (i.e., "5"), and name references (i.e., "x", "sin"). Operations are also listed below expression objects. These operations combine one or more subexpressions such as $+$, $-$, x, $\div$, $\sqrt{}$, function call, $=$, $<$, matrix, etc. The next type of object is a proposition object. These contain zero or more expressions or propositions but are not themselves expressions. Above proposition objects are theories which contain other propositions and plots which are propositions to constitute drawing elements for a graph.

FIGS. 18A and 18B are diagrams of the internal fields in an "object" structure and a source code listing of its declaration. In FIG. 18, an object 1801 includes type, size, flags, level, and sub-object count. The type specifies the kind of object and, in a preferred embodiment, is an ASCII character. The parameters outlining the rules are set such that the type must be a byte ranging from "space" (ASCII 32) through "—" (ASCII 126) inclusive. Capital letters represent proposition objects, and other characters represent expression objects. A complete list of types and their meaning in the preferred embodiment is given in table 1. A "size byte" 1805 is a byte giving the text size of the displayed expression object. For example, an expression that is a superscript or subscript of another expression is drawn smaller. There are three sizes referred to as "main," "small" and "tiny." The main expression has a small superscript which may have a tiny superscript itself. If a tiny expression has a superscript or subscript, it remains tiny.

Flag position 1807 includes flags for keeping track of various details mainly concerned with the object drawing apparatus. A more detailed explanation of the flag bits is presented in the source code appendix.

"Level byte" 1809 is used in the outlining feature and the collapsing feature. In the case of propositions it indicates the outlining level wherein zero is the top (leftmost) level, one is the first level of children, two is the children of level one, and so on and so forth. The internal data structure for theories is simply a linear list of propositions, each of which has a "level" number indicating the level of that proposition. The outlining code maintains the illusion of a tree data structure. Other aspects of the invention need not be concerned with the outlining and may treat it as a list of propositions.

The collapsed bit is true if the proposition or expression is collapsed.

Sub-object count 1811 is the index beyond which there are no sub-objects. For example, a "$+$" object with three terms to be added together will have a count of three and will have the handles for the three subexpressions with indices zero, one and two. (Therefore, three is the first object that is not there). Expressions always start with sub-object zero, therefore the count is always equal to the number of sub-objects. However, propositions may start with a sub-object other than zero. The routing "FirstSubObj( )" defines the first sub-object for any given object that may be used. The count which results indicates the last sub-object. For example, a line plot always has a count equal to four and a first sub-object equal to one. This means that the zero sub-object actually is used for some other purpose, sub-objects one, two and three are expressions, and beyond sub-object three is other data.

A "zone" 1813 describes where an object is drawn on the screen relative to its parent. Zone 1813 consists of the coordinates of the upper left and lower right corners of an enclosing rectangle, and the "math" number, which is the distance from the top of the rectangle to the math axis. The math axis is useful for lining up expressions. Zone 1813 will be further described with reference to FIG. 19.

A parent pointer 1815 points to the parent of a given object. An associated parent index 1817 indicates the index in the parent object of the particular object in question.

Figure 19:
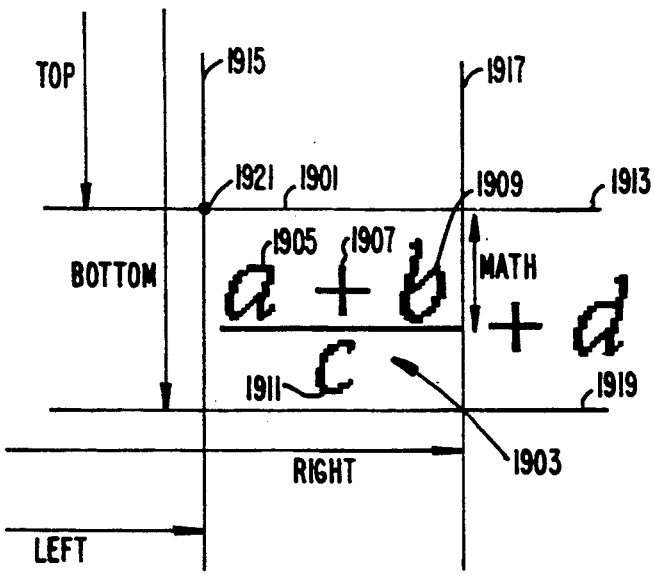
FIG. 19 is a diagram showing an expression as displayed along with a "zone" structure which describes location and proportions.

FIG. 19 is a diagram showing an expression as displayed along with a "zone" structure describing the proportions and location of the character. Zone 1901 is shown containing an expression 1903 including a group of expression elements: a, 1905; "+", 1907; b, 1909; and c, 1911. Zone 1901 is defined by a top boundary 1913, a left boundary 1915, a right boundary 1917 and a bottom boundary 1919. These boundaries are used in displaying the expressions and expression elements.

All dimensions of the zone are measured in values which are relative distances from the top left corner of a parent object. For example, point 1921 is at the top lefthand corner of the zone. Therefore, the child, or expression within the parent equation, is measured relative to point 1921. For the equation $$\frac{a+b}{c} + d,$$

the term $$\frac{a+b}{c}$$

has the same level along the top as the parent. In addition, its left boundary 1915 is at the zero level. However, the right boundary may be positioned at a distance of 30 from the top left corner while the bottom edge may be at a distance of 20. The numbers chosen are arbitrary units and may vary as long as they are the same relative to each other.

A preferred embodiment of the present invention is implemented with the programming language C. A system of dispatch tables for routing messages is implemented. For examples of dispatch tables, see the "msg" section of obj.h and the end of Taylor.c, simplify.c, and expand.c. The file obj.c and obj.h are the central files for object management.

Manipulations are the performance of algebraic operations in the present invention. Each manipulation is a command which the user performs in one of many ways to alter existing equations and make new equations which are intended to be valid based on the previously existing equations from which they are derived.

Figure 20:
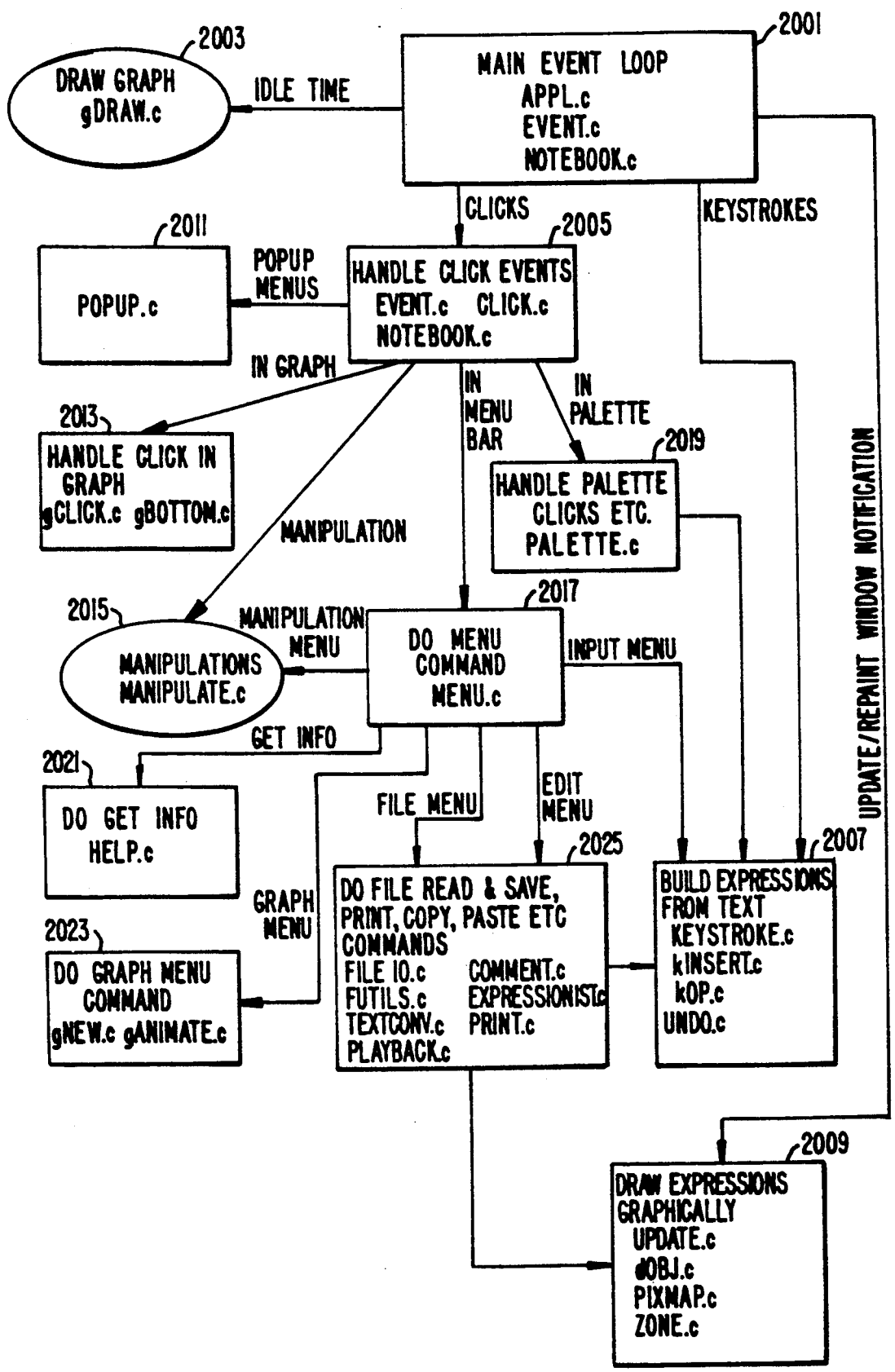
FIG. 20 is a state diagram showing the states that a selection moves between as a user enters an expression.

The manipulations are performed by software which is organized in segments. FIG. 20 illustrates the organization of the segments. A main portion of code 2001 handles the highest level of operation and passes control to the other segments depending upon what operation is required. Main portion 2001 includes a first portion entitled APPL.C which includes the main application routine. In addition, main portion 2001 includes part of EVENT.C which handles event dispatching and other information boxes and cursor shape changes as well as part of NOTEBOOK.C which handles the creation and disposal of notebook windows and the dispatching of events such as checks, update (repaint) events and activate (focus) events.

A group of code segments receives control passed from main portion 2001. These segments include draw graph block 2003, click event handler 2005, build expression block 2007, and draw expression block 2009. Draw graph block 2003 includes GDRAW.C which manages the drawing of graphs on the computer screen the printer.

Click event handler 2005 handles events initiated upon depression of the switch on mouse 102A. There are three portions of code in EVENT.C, NOTEBOOK.C and CLICK.C which may be accessed during mouse clicks. The parts in EVENT.C and NOTEBOOK.C are different from the portions of code discussed with respect to main portion 2001. Creation CLICK.C handles the processing of mouse clicks.

Build expression block 2007 handles the inputting of text from the keyboard and from files. This includes the forming of equations as well as the editing of equations. Build expression block 2007 accesses a number of code segments including KEYSTROKE.C, KINSERT.C, KOP.C, and UNDO.C. KEYSTROKE.C, accepts keystrokes from the keyboard, and builds expressions. For example, if a user selects a "+" function, two elements must be received to complete the function. Therefore, KEYSTROKE.C is used to accept each of these elements. This code segment is also used to paste entry of expressions and propositions as well as for file input. KINSERT.C is subordinate to KEYSTROKE.C and performs miscellaneous keystroke routines.

KOP.C handles the processing of keystrokes related to operations such as "+," "−," "÷," and "*." UNDO.C is a routine which tracks the previous entry so that the user can issue the undo command to back out of the change.

Draw expression block 2009 is accessed by main portion 2001 when drawing is required. This block includes UPDATE.C, OBJ.C, PIXMAP.C and ZONE.C, each of which is used during various aspects of the drawing function. UPDATE.C has routines in general for drawing individual objects and expressions. Object types are handled by DOBJ.C. For example, DOBJ.C handles size calculations and drawing of particular expression types such as integers, square root, and wordy propositions. PIXMAP is a routine for handling off-screen bitmaps and pixmap images. ZONE.C sets up the various zones as discussed with respect to FIG. 19.

The software of the present invention includes a large number of code segments which are accessed at different times. A number of these segments have been discussed above. Further, many more of these segments are listed in FIG. 20 and described below. These segments will not be further described here, but will be referenced where necessary.

Click event handler 2005 accesses a group of code segments to respond to click events. These segments include POPUP.C 2011 for handling clicks in pop-up menus, graph function 2013 for handling clicks in graphs, manipulation block 2015 for manipulating expressions, menu command block 2017 for displaying a menu of options, and palette function 2019 for performing palette functions.

Menu command block 2017 displays a menu of options to the user. The user may choose a manipulation in which case control will be passed to manipulation block 2015. Alternatively, a help menu may be selected in which case control passes to Info block 2021. Another possibility is to display a graph menu. Control then passes to graph block 2023. Finally, a user may choose to perform an input/output function from command block 2025. Choosing an input/output function will cause the software to access a group of code segments which may, in turn, send control to either build expression block 2007 or draw expression block 2001.

Figure 21:
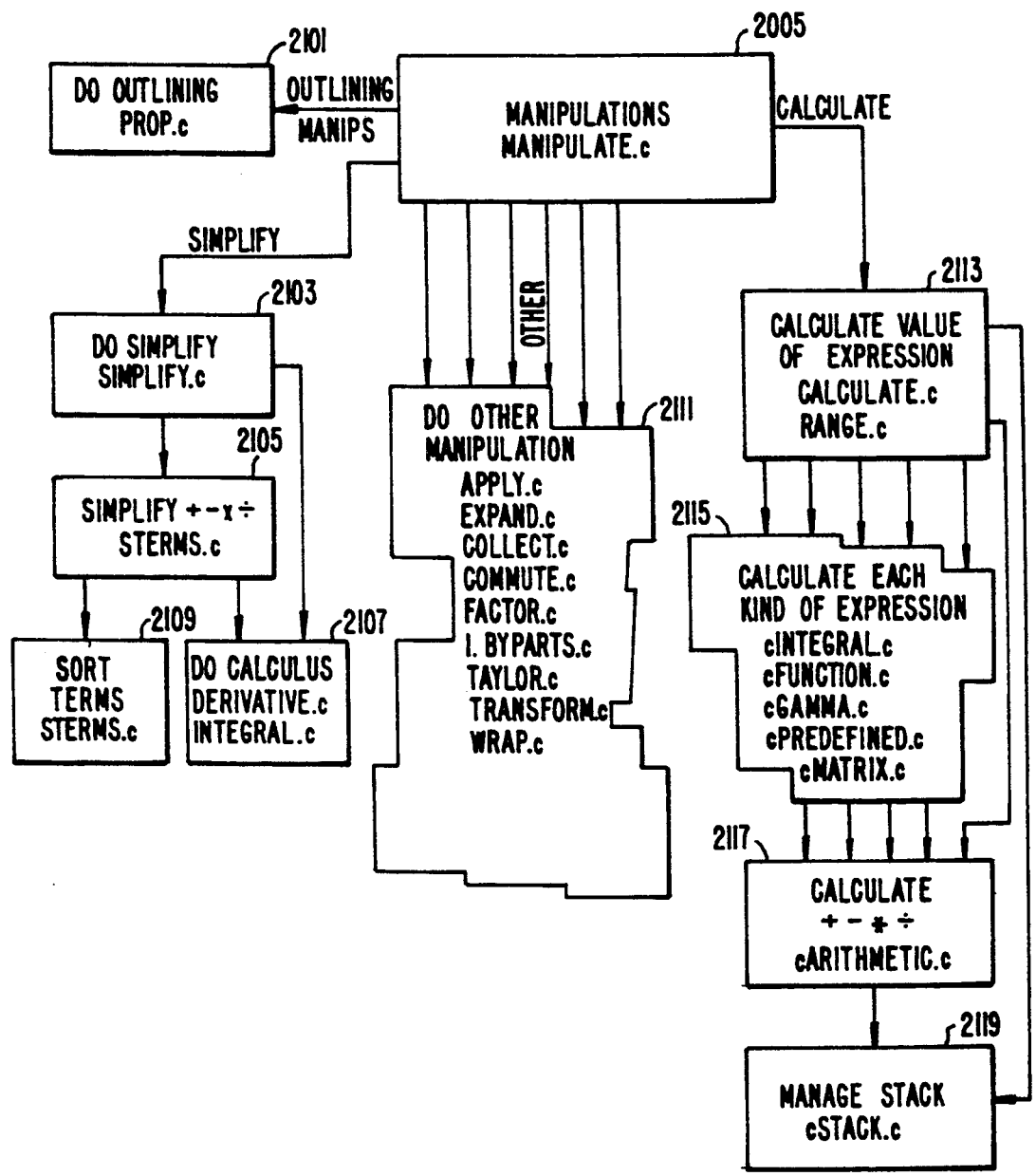
FIG. 21 is a block diagram of the organizational structure of the software which is included in a preferred embodiment.

FIG. 21 is a diagram illustrating the organizational structure of manipulation block 2015 of FIG. 20. When a manipulation is initiated by the user, there are a number of events which may occur. First, an outlining manipulation may be requested. This is illustrated by outline block 2101. Second, a simplification manipulation may be requested. This is illustrated by simplify block 2103. Simplification is a complicated operation that performs various manipulations on different kinds of expressions. Therefore, each of these forms are shown in the different blocks below simplify block 2103. Simplification of one of the four functions is symbolized by simplify terms block 2105 and simplification of calculus operations is shown in calculus block 2107. Sort terms block 2109 sorts the equation elements as part of a simplify operation has been performed.

A third group of manipulation operations is shown in miscellaneous manipulation block 2111. These manipulations include expand, factor, transform, etc. Finally, if the manipulation is a calculation illustrated by calculation block 2113, calculation block 2113 accesses a group of calculation routines shown in calculate type block 2115, calculate operation block 2117 and manage stock block 2119.

FIG. 22 is a more detailed block diagram of draw graph block 2003 shown in FIG. 20. Partial draw block 2201 is used to draw the various parts of a graph. This block may access lower level routines shown in low-level graph block 2203.

It should be understood that there are a number of routines which may be called from many of the blocks. These routines are shown in FIG. 23 and include ERROR.C which indicates there has been an error, GETCLASS.C which determines the class of a given expression, as well as ISLINEAR.C, LIBRARY.C and PSTR.C.

FIG. 24 is a block diagram of the object management subsystem. Each block in this diagram represents a different type object: "ops" 2401 is for operation objects such as "+," "−," "*," "÷," "Σ," "√," etc.; "numbers" 2403 is for numbers; "matrices" 2405 is for matrices; "names" 2407 is for variable names; and "proposition and theories" 2409 is for handling propositions and theories. The main object type block 2411 is called from any of the other blocks. Object types are described in more detail above with reference to FIG. 18.

Parent section 1815 and parent index 1817 (FIG. 18) are the fundamental means for tracking the position in a tree. Parent 1815 and parent index 1817 of a particular object defines a slot in which an object can be placed. GetObj(parent, parentindex) will return the object to that location. An object and its parents are linked together with reciprocal pointers. Each object has a pointer that points to its parent while each parent has zero or more pointers to sub-objects. If either pointer is null (zero value) then it is 30 non-existent and is somehow detached from its parent or sub-objects.

Internally, the fundamental means for modifying trees are the TakeObj( ) and SetObj( ) routines. TakeObj(parent, index) works in a manner similar to GetObj(parent, index), except that it detaches the object, leaving a null in its place. SetObj(parent, index, newobj) sets a new object in a given slot, disposing of any previous object. These routines maintain the reciprocal pointer relation flagging an internal error if an inconsistency is found.

Litteral.c and fun.c contain many routines for creating new expression objects. For example, the routine NewInt(n) makes an integer object of a given integer, n while nOne( ) makes an integer 1. nPlus(a, b) takes two expressions "a" and "b" and adds them together with a "+" operation having two subexpressions.

Object drawing is a two-pass process. During the first pass, sizes and locations are calculated while during the second pass drawing takes place. Each object type has its own size routine and its own draw routine. The size and draw routines are recursive.

The tree of a particular object is first traversed by the "size" routine. Each routine first calls the size routine of an enclosed object, then the size and proportions of the object are calculated as determined by the subobject sizes. The subobject's zones are also modified to properly place the subobject relative to the object's top left corner. Each size routine leaves its own object with its top left corner at (0, 0); this is subsequently modified by the size routine's caller. At the top level, the top level object may be offset for a variety of purposes. (For instance, detached expressions are frequently drawn in dialogues for error messages, etc.)

Next, the tree of an object is traversed by the "draw" routine, which first draws all of its subobjects, then draws itself. Many objects draw very little, or nothing at all. For instance, a subscript operation draws nothing but its two subobjects. An integer object draws a short string of text.

The object drawing routines are complicated by several factors, mostly related to speed. Any editing routine that modifies some object displayed on the screen requires the use of the DeSizeObj( ) routine, or one of its variants. This routine instructs the drawing subsystem that the size of a portion of the drawing was changed and redrawing is required. In addition, many operations that change objects on the screen call the routine DeSizeNDraw( ). This routine redraws the given object and possibly surrounding objects. Instant feedback is provided to keystrokes entered by the user without having to go through the exercise of repainting the whole screen after each keystroke for feedback.

All propositions are drawn into an offscreen bitmap and then applied to the screen to avoid unsightly blink. This speeds up screen redraw considerably since it is usually the case that when propositions are redrawn, they have not changed anything but their position.

The main means whereby objects are edited and created by the user is by keystrokes and menu commands. The user makes a selection, typically by clicking and selecting through the use of mouse 102A for a particular proposition or expression. Subsequent keystrokes cause expression pieces to be added at the point of selection.

The preferred embodiment permits multiple kinds of selections. This represents a mixture of the textual selections typical of word processors and other equation editors on the one hand, and object-oriented multiple selections of the Macintosh Finder and various draw and page layout programs.

As with textual selections, the user can click and select any subexpression that is a "proper" subexpression. Further, as with certain other Macintosh programs, the user can hold down a modifier key on the keyboard and make an additional selection in another location. Subsequent keystrokes now target each selection. For instance, if a user selects three places and types the characters "abc", "abc" would be inserted into all three places simultaneously. This feature is especially useful when simultaneously entering the elements of a large matrix.

In general, the rule for multiple selections is that any editing on one entry would be made to each entry selected. This presents some logical problems. For instance, the Macintosh clipboard is a single data structure. If a user Pastes into multiple selections, what is pasted will be duplicated in all locations. If a user copies out of multiple selections, however, there is no way to put the information copied out into the clipboard, so copying out of a multiple selection is prohibited. In addition, some operations use a multiple selection differently such that executing it simultaneously on a multiple selection is not the same as executing it individually on each selection.

The code that handles the details of an individual selection's response to keystrokes is contained in three source files (Keystroke.c, kInsert.c and kOp.c). A simplified explanation follows.

The four main types of expression objects are numbers (sequence of digits, possibly with decimal point and exponent); names (sequence of letters, including Greek letters and other symbols); the unknown (a blank space to type into, symbolized by a "?"); and ops (built-in operators that connect expressions, such as +, *, ^, etc.).

The three main kinds of keystrokes that a user enters are digits (used to construct numbers; include "." and "e" sometimes); letters (used to construct names); and "op" characters (such as +, −, _, =, >, <, ;).

There is no keystroke to make an unknown; when an op character is entered, the op is connected to an unknown that is automatically selected. The next keystroke makes a new name or number with that keystroke in it.

Figure 25:
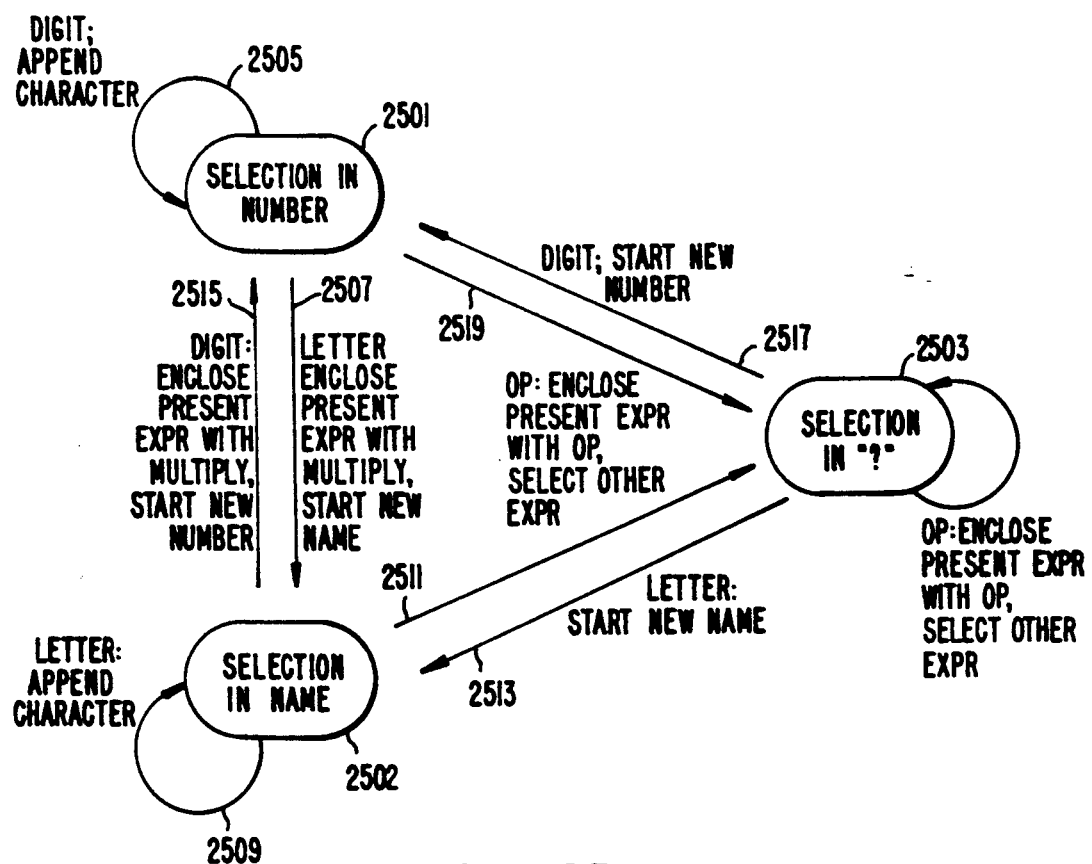
FIG. 25 is a block diagram of the object management subsystem.

As can be seen in FIG. 25, each selection undergoes state transitions as it receives keystrokes, building the expression in an intuitive fashion. Numbers and names behave as character strings as long as the entry of digits or letters continues, respectively. For example, if a "2" is entered, selection in state 2501 is controlling. If the next entry is a number, "5" for example, the string continues as shown by arrow 2505 forming numeral "25."

Typing an op into either a name or number causes the currently selected expression to be enclosed by the op as symbolized by arrow 2519 thereby causing a transition to state 2503. The selection then moves to the other argument of the op, an unknown. For example, suppose "abc+d" is entered. Entry of "abc" is starts at state 2503. When "a" is selected, a transition is made along arrow 2513. A second and third transition along arrow 2509 occur when the "b" and the "c" are entered. There remains a selection in the name "abc", after the c. When "+" is typed, the "abc" is enclosed in a "+" op symbolized by arrow 2511 with an unknown, to yield "abc+?". The user is then placed at state 2503 in the state diagram. Also, the current selection will cover the "?" so that the keystroke "d" will replace the "?" resulting in: "abc+d". At the point when the "d" is entered, the current state transitions from state 2503 along arrow 2513 to state 2502. Similar action occurs as transition is made between states 2501 and 2503 along arrows 2517 and 2519.

Digits entered in a name or letters entered in a number cause the currently selected name or number to be multiplied onto a new number or name. This action is symbolized by transition between states 2501 and 2502 along arrows 2507 and 2515. Software converts multiplication ops into function call ops if appropriate. Therefore, typing "3x" is the same as typing "3*x" and "sin x" is converted to "sin(x)".

In practice there are precedence considerations. Therefore, if you type "3x+5", the "+" engulfs the "3x" not just the "x", even though that is what is selected at the time. Other complications include parentheses and various ops such as "−" which need to be specially handled. Complete details are contained in the source code appendix.

The "click-and-drag loop" is a technique which finds utility in a number of routines. For example, when the user clicks down to select expressions or to perform a manipulation while the user is dragging, an accompanying animated drawing appears on the screen informing the user of what he is undertaking. The way in which this is accomplished depends upon how the graphical user interface system delivers events to the user. In all cases, the system (or the event loop) calls the routine. In the case of a Macintosh, the program has the opportunity to call the system to get mouse status. This means that the code to perform the click and drag loop is a loop. In the case of other systems such as Microsoft Windows, where the system delivers mouse-move events to the program, a more complicated scheme must be developed with flags to remember what stage of click-and-drag the user is in.

In most cases the graphics for animation within a click and drag loop are done in an exclusive-or mode so that the program simply removes the drawing by redrawing it a second time. Of course, alternatives to this approach are possible, including saving the screen image for the restoration later.

Provided below is a pseudocode outline of what is needed to implement a click-and-drag loop:

set last status to be status of the initial mouse location
draw last-status
while (mouse button is held down)
    check mouse position
    calculate current-status based upon mouse position
    if current status is not the same as last-status
        undraw last-status
        draw current-status
        last status = current-status
    end of while loop
undraw last status
if all is OK, perform action according to last-status In the above code, "status" is a higher level description of the position of the mouse. For example, if the mouse is dragged around selecting expressions, the "status" is the expression currently being pointed at. This way, the selection doesn't blink as the mouse is moved around the same expression; only when a border is crossed and the status changes. Drawing the status means highlighting the expression.

The preferred embodiment contains a segment of code for performing simplification. The code for simplifying expressions depends upon its root type (Simplify.c). The code for the four functions (+,−,*,/) is roughly the same (sTerm.c), illustrated here with addition. A given expression is rewritten in a particular form consisting of a constant number and a list of terms. Each term consists of an indivisible expression and a coefficient which is a constant number. Each constant is either a real number or a rational number (fraction of integers). Hopefully, the indivisible expression is really indivisible; if it is in fact a sum or similar, the algorithm breaks that apart and adds it to the list, recursively.

Constants that are "added" to the list are of course incorporated into the running constant.

The list is then sorted according to a well-chosen algorithm (see sOrder.c). The list is then searched for consecutive elements with the same expression; these are combined. Finally, the list is rewritten as a user-friendly expression with the constant added at the end. For instance, if the constant is zero, a "+0" is not placed at the end.

The algorithm for processing products is similar. For example, simplifying "2x+3x+12" is almost exactly the same as simplifying "$12x^2x^3$."

The graphics subsystem creates and maintains graphs which are complex structures for drawing mathematically defined pictures. It uses the calculation subsystem to calculate the data values for use in the graphics. The attached source listing should be consulted for details encompassing the graphing techniques used.

The calculation subsystem calculates the value of expressions. It contains many interconnections with the Knowledge subsystem. The fundamental data structure is a stack that holds variable-sized numerical values. The types of values that may appear on the stack include:

integers (32 bit signed)
floating real (80 or 96 bit IEEE)
complex (two floating reals)
$M \times N$ matrices consisting of integers, reals or complex Routines are provided for pushing and popping such values on or off the stack, and for performing all arithmetical operations on top of the stack. For instance, AddStack( ) will add together the top two values, regardless of type, converting as necessary and raising errors in case of incompatible types.

Variables and functions that are user defined are evaluated; the name and the definition rendezvous through the Knowledge subsystem.

The knowledge subsystem is the central nervous system of the present invention. Each theory in a notebook has a tree structure referred to as a knowledge structure that keeps track of what is known about particular names and associated subscripts. The knowledge includes:

a defined value
a defined minimum or maximum
a defined natural increment
information on what other variables this one may be independent of
a defined maximum order (see the reference manual)
a temporary value in use All of this information is gleaned from the theory and its equations regularly; it is updated whenever the user edits any significant equation.

It should be noted that each theory has its own record of all of this information. The construction of this record starts when a theory copies all knowledge from its parent theory. It is augmented with what is available in the theory itself. A system informs the present invention when this data needs to be updated (see Knowledge.c for more details). It should also be noted that not only is there knowledge for each name, but for each subscripted form of each name that is found. Once again, consult the source code appendix for more details.

In general, to those skilled in the art to which this invention relates, many changes in construction and widely differing embodiments and applications of the present invention will suggest themselves without departing from its spirit and scope. For instance, implementation is possible on a variety of different workstations with different pointing devices. It would be especially appropriate to use touch screens or other systems attempting to give the user a more tactile feel over the machine. Thus, the disclosures and descriptions herein are purely illustrative and are not intended to be in any sense limiting. The scope of the invention is set forth in the appended claims and their legal equivalents.

TABLE 1

| Theorist Object Types | | | | | | | |
|---|---|---|---|---|---|---|---|
| * descrip | * descrip | * descrip | * descrip | * descrip | * descrip | * descrip | * descrip |
|  | ! a! | " | # | $ | % sqrt(a) | &' | symbol |
| ( (a) | ) Eval At | * a*b*c... | + a+b+c... | , | - -a | . | / a/b |
| 0 | 1 | 2 | 3 | 4 | 5 | 6 | 7 |
| 8 | 9 | : a...b | ; func call | < a<b | = a=b | > a>b | ? unknown |
| @ | A Assum | B | C Conclu | D Dens Plot | E | F | G 2D Graph |
| H Tx Rule | I Indep Dec | J | K | L Line Plot | M Main Thry | N | O Contour Plot |
| P Pic Comm | Q Comment | R Grid Plot | S | T Case Thry | U | V VarDef | W |
| X Axis | Y | Z 3D Graph | [ a≦b | \ a≠b | ] a≧b | ^ $a^b$ | _ $a_b$ |
| Wildcard | a adjoint | b | c cross prod | d dot prod | e | f | g |
| h | i integer | j integral | k | l | m matrix | n number | o |
| p ∂/∂a | q | r real | s Σ | t | u | v var ref | w |
| x | y | z | { Condition | \| \|a\| | } | ~ | |

All capital letters are props; all others are expressions.

A, C:     [0] - the equation expression
        [1] - contingencies handle (conclusions only)
        [2] - flags
D, L, R and X are all plots.
        [0] - handle to cache
        [1] - the locus vector
X-     [2] - the label value
G-     [2] - first range
        [3] - second range
        [4] - increment
D-     [2] - first range
        [3] - second range
        [4] - shade value
G, M, T, Z are all theories.
        [0] - knowledge block handle

TABLE 1-continued
Theorist Object Types

| | | |
|---|---|---|
| M- | | [1] - notebook window pointer |
| | GZ- | [1] - contingencies handle |
| | | for rest See Obj.h |
| H | | [0] - pattern |
| | | [1] - result |
| | | [2...] - manip popup menu |
| I | | [0] - var list |
| | | [1...] - popup |
| P | | [0] - pic handle |
| Q | | [0] - TextEdit handle |
| V | | see Obj.h |
| v,' | | [0...] - pascal string for the value |
| i | | [0] - 32 bit integer value |
| r | | [012] - 10 or 12 byte IEEE float |
| m | | [after last] - a longword with the rows, cols as two shortwords |
| v | | [0] - var def handle |
| | | [1] - abbreviation of name (debugging only) |
| \ | | [0] - match character, a-z, in a pascal string. |

All others are unary, binary, trinary or n-ary ops. First subobj is 0, fixed or variable length.

SOURCE FILES

The following is a file-by-file description of the parts of a preferred embodiment of the present invention.

appl.c—main application routine, event loop, and event dispatching appl.h—defines for the application and its details (most Mac specific)

Apply.c—routines for the Apply manipulation

Axis.c—routines for axes in graphs

Calc.h—defines for Calculation subsystem cArithmetic.c—routines to do various basic operations on the calculation stack (eg + − * ÷,square root, etc) on integer,real, complex and matrix values cCalculate.c—routines to calculate the value of a symbolic expression; also routines to handle the Calculate manipulation cFunction.c—routines for calculating built-in functions (egtrig, log, hyperbolic) for real and complex values cGamma.c—routines for calculating the real and complex gamma function cIntegral.c—routines for calculating numerical integrals Click.c—routines for processing mouse clicks cMatrix.c—routines for calculating with vector and matrix values (product, determinant, inverse, cross product, etc.)

Collect.c—routines for the Collect manipulation

Comment.c—routines for handling Comment propositions

Commute.c—routines for Commute manipulation cPredefined.c—routines for calculating predefined constants (e, $\pi$, graphics constants)

cStack.c—routines for low-level calculation stack maintenance defs.h—defines for use throughout the entire program (such as TRUE, NULL, etc)

Derivative.c—routines to take symbolic derivatives during Simplify manipulation dObj.c—routines for sizing and drawing specific object and expression types (integer, square root, wordy propositions)

Equivalent.c—routines for determining if two expressions are equivalent or close (includes pattern matching and support for substituted variables in patterns)

error.c—routines to handle errors throughout the program; also some memory management routines Event.c—additional routines for handling event dispatching; also routines for handling about and other information boxes, and cursor shape changes Expand.c—routines for the Expand manipulation Expressionist.c—routines for exporting equations to the Expressionist equation typesetting program Factor.c—routines for the Factor manipulation FileIO.c—routines for handling commands to open, close, save, rename, revert notebooks (etc)

FileText.h—defines associated with file i/o

FloatLib.c—handy routines used for floating point numbers that aren't supplied by the machine or compiler fun.c—routines for dealing with op-style expression objects (mostly creating them)

FUtils.c—file utilities such as setting file type and creator, deleting files, etc.

gAnimate.c—routines to manage graph animation gButton.c—routines to handle user actions on buttons in graphs gClick.c—routines to handle clicks of all kinds in graphs gColor.c—routines to specify colors in surface plots in graphics (such as choosing the custom colors, complex color mapping, RGB, CMY, etc.)

gDraw.c—top-level routines managing the drawing of graphs, whether to screen or to various printing devices GetClass.c—routines to determine the class of a given expression gNew.c—routines to generate new graphs from user actions Graph.c—miscellaneous routines for graphs Graph.h—defines for the graphics subsystem Grid.c—routines to handle Grid plots in graphs gSort.c—routines to manage drawing 3D graphs (all parts of the graph must be sorted according to their Z coordinate and drawn from back to front)

gVirtual.c—a graphics library whereby callers can draw graphics without being concerned whether the graphics being generated is PostScript or QuickDraw (the native Mac graphics system)

Help.c—routines for handling the Get Info command

Hilite.c—routines for highlighting on the screen the current selection

I. By Parts.c—routines for the Integrate-By-Parts manipulation

Integral.c—routines to perform symbolic integration of expressions

IsLinear.c—routines IsLinear( ) and IsConstant( ) which determine whether a given expression is constant or is linear with respect to another variable, given the current theory context Item.c—routines for handling dialog items item.h—defines for handling dialog items Keystroke.c—routines for accepting keystrokes into the current selection, used for keyboard input, Paste entry of expressions and propositions, and file input kInsert.c—miscellaneous routines for keystrokes Knowledge.c—main routines for the Knowledge subsystem kOp.c—routines for handling and processing keystrokes for ops (eg + − * / = ^ etc)

Library.c—miscellaneous routines

LinePlot.c—routines for handling line plots in graphs, and for drawing curves for axis plots and grid plots Litteral.c—routines for handling integer, real, "number", symbol, and unknown expression objects Manipulate.c—top-level routines for doing manipulations Manipulate.h—common defines used among many manipulations Matrix.c—routines for editing (creating, adding and removing rows or columns) and symbolic operations (determinant, inverse, etc) on matrices Menu.C—central dispatch routine for menu commands (DoMenu( )); also other routines for enabling, disabling menu items; also routines to handle certain preferences Notebook.c—routines for handling notebook windows: creation/disposal, and the dispatching of events such as clicks, update (repaint) events, activate events, etc.

Notebook.h—defines for use in dealing with notebooks

Obj.c—low-level routines for creation, disposal, modification and traversal of objects in general, in addition to getting information about objects Obj.h.—central include file for Theorist: contains defines on object format (including various object types), knowledge, message dispatching, selections and many other things Palette.c—routines for handling the floating palette Pixmaps.c—routines for handling off-screen bitmap (1 bit deep) and pixmap (2 or more bits deep) images Playback.c—routines for reading back non-expression characters and for receiving input from Paste or from file reading Plot.c—common routines for drawing plots in graphs Polynomial.c—routines for doing various symbolic manipulations on polynomials (such as polynomial division)

PopupMenu.c—routines for handling popup menus

Predefined.c—routines to handle predefined names in general (including a table of all of them), also simplifying, expanding, differentiating, integrating and finding antifunctions of predefined functions PreDefined.h—common defines for predefined names (including all predefined name id's)

Print.C—routines for printing out notebooks from within Theorist

Prop.c—routines for handling propositions in general, including the built-in outliner, conclusion contingencies, and some routines for collapsars Pstr.c—routines for handling pascal strings (length indicated by a count in first byte instead of a terminating null byte at the end)

Range.c—routines for handling range loop structures that can maintain a counted loop while varying the value of a Theorist variable res.h—defines for resource ID's in the resource file (automatically generated but out of date)

Select.c—routines for handling user selections (but not clicking to select, nor the highlighting; see Click.c and Hilite.c)

Simplify.c—main routines for simplify manipulation, calls sTerms for $+-*\div$.

sOrder.c—routines for sorting terms in a sum or product during simplification sTerms.c—routines for simplifying $+,-,*$ and $\div$ expressions (all handled together due to much commonality), calls sOrder Substitute.c—routines for substitute manipulation, including dragging and highlighting routines SurfacePlot.c—routines for handling the surface plots and contour plots in graphs Taylor.c—routines for handling the Taylor Series Expansion manipulation TextConv.c—routines for converting expressions into text for copy out or notebook file output Theorist.h source—defines used by all .c files; includes defs.h in addition to a number of specific Macintosh system include files Theory.c—routines to handle theories in general and Case Theories in particular Transform.c—routines to handle the Transform manipulation, and to look up transformation rules for the Simplify, Expand and Collect manipulations Undo.c—routines to handle the Undo command, and to save notebook status before the user does each editing command so that undo can be performed Update.c—routines to draw objects and expressions (but no routines for specific object types; see dObj.c)

Update.h—defines concerned with object drawing

Var.c—routines to handle name (variable) reference and definition objects

Wrap.c—routines to handle the Isolate and Move Over manipulations

Zone.c—routines to handle Zone date structures (just like rectangles, with the addition of a math axis number)

[test].c—routines used for Theorist diagnostics; the menu accessing these commands is removed and made inaccessible before the software is released finally.

What is claimed is:

1. A computer system programmed to provide an interactive mathematical manipulation apparatus for displaying mathematical expression elements and equations on a display which are manipulated by a user in accordance with conventional rules of mathematics, comprising:

input means for inputting expression elements and equations by the user;

display means for displaying the expression elements and equations;

pointing means for identifying particular expression elements and equations displayed on said display means to be manipulated and for transmitting location data representing element and equation locations;

processing means for tracking manipulations of the expression elements and equations including, receiving means for receiving the expression elements and equations input by the user via said input means, generating means for generating display data representing a display position of expression elements and equations in response to the expression elements and equations received by said receiving means, and transmitting means for transmitting said display data to said display means;

storage means coupled to said processing means for storing data and instructions;

editing means connected to said input means and said processor means for receiving editing instructions from the user and for editing the expression elements and equations displayed on said display means; and manipulation means for receiving said location data from said pointing means and manipulating the expression elements and equations in accordance with a change in position as defined by said location data and for transmitting location data to said processor means such that the expression elements and equations are manipulated on said display means in accordance with said location data wherein the conventional rules of mathematics are applied to manipulations to maintain consistency in truth between the expression elements and the equations as input by the user.

2. The apparatus of claim 1 further comprising first maintenance means for providing manipulation of a first set of equations such that said first maintenance means maintains consistency in truth among said first set of equations by preventing any of said equations in said first set from being mathematically inconsistent with any other of said equations in said first set.

3. The apparatus of claim 2 further comprising second maintenance means for providing manipulation of a second set of equations such that said second maintenance means maintains consistency in truth between said second set of equations wherein said first set of equations and said second set of equations are inconsistent with respect to each other.

4. The apparatus of claim 3 further comprising segregation means for displaying said first and second set of equations on said display means in segregated form such that said first set of equations are enclosed in a first area and said second set of equations are enclosed in a second area.

5. The apparatus of claim 1 further comprising multiple result means for displaying on said display means a multiplicity of resulting equations in response to a manipulation which provides more than one possible result.

6. The apparatus of claim 1 further comprising interpretation means for interpreting the expression elements and equations and providing a graphic illustration of a result on said display means.

7. The apparatus of claim 1 further comprising outlining means for automatically arranging the expression elements and equations in an outline form.

8. The apparatus of claim 7 wherein said outline form is arranged such that equations which are the result of manipulation of a previously existing equation are indented so as to be subordinate to said previously existing equation.

9. The apparatus of claim 1 further comprising selection means for selecting a plurality of expression elements or equations and for performing editing and manipulations on each of said plurality of expression elements or equations substantially simultaneously, wherein at least some of said plurality of expression elements or equations are not identical.

10. The apparatus of claim 9 wherein said plurality of expression elements are matrix elements.

11. The apparatus of claim 1 wherein said processing means further comprises balance modification means for altering an equation by modifying at least two locations substantially simultaneously to maintain consistency in truth of an altered equation.

12. The apparatus of claim 1 wherein said pointing means further comprises movement means for depicting movement of said particular expression elements and equations on said display means.

13. The apparatus of claim 12 wherein said movement means depicts movement of said particular expression elements from a first side of an equation to a second side of said equation.

14. The apparatus of claim 1 further comprising isolation means for isolating a particular subexpression in an equation and performing a manipulation to isolate said particular subexpression on a first side of said equation in accordance with the conventional rules of mathematics.

15. The apparatus of claim 1 further comprising global substitution means for targeting said multiplicity of resulting equations and substituting substantially simultaneously for a particular expression data in each of said multiplicity of resulting equations a predefined mathematical expression.

16. The apparatus of claim 1 further comprising:
rule storage means for storing a plurality of rules; and
transformation means for transforming a particular expression in accordance with one of said plurality of rules.

17. The apparatus of claim 1 further comprising substitution means for substituting a first set of expression elements defined as being equal to a second set of expression elements identified by said pointing means into a target equation.

18. The apparatus of claim 1 further comprising parentheses means for recognizing various parentheses styles input by the user and converting recognized parentheses in accordance with a preselected parentheses standard defined within software on the computer, and wherein said generating means generates display data containing various parenthesis styles in accordance with a preselected parenthesis display standard.

19. The apparatus of claim 18 wherein said parentheses means equates said various parentheses styles input by the user.

20. The apparatus of claim 1 further comprising collapsing means for displaying particular expression data and equations in a collapsed form on said display means.

21. The apparatus of claim 20 wherein said collapsed form displays a plurality of said expression data and equations via an indicator on said display means representing an expanded form of said expression data or equations.

22. The apparatus of claim 21 further comprises expansion means for expanding a particular data expression or equation wherein the user locates said pointing means on a particular indicator and provides an instruction to expand said particular indicator.

23. In a computer programmed to provide interactive mathematical manipulation for displaying mathematical expression elements and equations on a display which are manipulated by a user in accordance with conventional rules of mathematics, a computer implemented method comprising the steps of:

- inputting expression elements and equations on an input means;
- displaying the expression elements and equations on a display means;
- identifying particular expression elements and equations displayed on said display means to be manipulated and transmitting location data representing data element and equation locations;
- tracking manipulation of the expression elements and equations upon receiving the expression elements and equations input by the user via said input means,
- generating display data representing the display position of expression elements and equations in response to the expression elements and equations received;
- transmitting said display data to said display means;
- receiving editing instructions on said input means from the user and editing the expression elements and equations displayed on said display means in accordance with said editing instructions; and
- receiving said location data and manipulating the expression elements and equations in accordance with a change in position as defined by said location data;
- manipulating the expression data and equations on said display means in accordance with said location data wherein the conventional rules of mathematics are applied to manipulations to maintain consistency in truth between the equations as input by the user.

24. The method of claim 23 further comprising the steps of:
- manipulating a first set of expression elements and equations such that said first set of expression elements and equations remains consistent respecting truth between said first set of expression elements and equations as input by the user; and
- manipulating a second set of expression elements and equations such that said second set of expression elements and equations remains consistent respecting truth between said second set of expression elements and equations as input by the user wherein said first set of expression elements and equations and said second set of expression elements and equations are inconsistent with respect to expression elements and equations.

25. The method of claim 24 further comprising the step of displaying said first and second set of equations on said display means in segregated form such that said first set of equations are enclosed in a first area and said second set of equations are enclosed in a second area.

26. The method of claim 23 further comprising the step of displaying on said display means a multiplicity of resulting equations in response to a manipulation which provides more than one possible result.

27. The method of claim 23 further comprising the step of interpreting the expression elements and equations and providing a graphic illustration of a result on said display means.

28. The method of claim 23 further comprising the step of arranging the expression elements and equations in an outline form.

29. The method of claim 28 wherein said outline form is arranged such that equations which are the result of manipulation of a previously existing equation are indented under said previously existing equation.

30. The method of claim 23 further comprising the step of selecting a plurality of expression elements or equations, wherein at least some of said plurality of expression elements or equations are not identical, and performing manipulations on each of said plurality of expression elements or equations substantially simultaneously.

31. The method of claim 30 wherein said plurality of expression elements are in matrix form.

32. The method of claim 23 further comprising the steps of:
- targeting a multiplicity of equations: and
- globally substituting substantially simultaneously a predefined mathematical expression for a particular expression in each of said multiplicity of equations.

33. The method of claim 23 further comprising the steps of:
- storing a plurality of rules in a rule storage means; and
- transforming a particular expression in accordance with one of said plurality of rules.

34. The method of claim 23 further comprising the step of depicting movement of said particular expression elements and equations on said display means.

35. The method of claim 34 wherein said movement of said particular expression elements is from a first side of an equation to a second side of said equation.

36. The method of claim 23 further comprising the step of targeting a particular data element in an equation and performing a manipulation to isolate said particular data element on a first side of said equation in accordance with the conventional rules of mathematics.

37. The method of claim 23 further comprising the step of substituting a first set of expression elements defined as being equal to a particular identified data element into a target equation.

38. The method of claim 23 further comprising the step of recognizing various parentheses styles input by the user and converting recognized parentheses in accordance with a preselected parentheses standard defined within software on the computer, and wherein said generating step comprises generating display data containing various parenthesis styles in accordance with a preselected parenthesis display standard.

39. The method of claim 38 wherein said parentheses means equates said various parentheses styles input by the user.

40. The method of claim 23 further comprising the step of displaying particular expression data and equations in a collapsed form on said display means.

41. The method of claim 40 wherein said collapsed form displays a plurality of said expression data and equations via an indicator on said display means representing an expanded form of said expression data or equations.

42. The method of claim 41 further comprising the step of expanding a particular data expression or equation wherein the user identifies a particular indicator and provides an instruction to expand said particular indicator.

43. A computer system programmed to provide an interactive mathematical manipulation apparatus for displaying mathematical expression elements and equations on a display which are manipulated by a user in accordance with conventional rules of mathematics, comprising:

input means for inputting expression elements and equations by the user;

display means for displaying the expression elements and equations;

processing means for tracking manipulations of the expression elements and equations including, receiving means for receiving the expression elements and equations input by the user via said input means, generating means for generating display data representing a display position of expression elements and equations in response to the expression elements received by said receiving means, and transmitting means for transmitting said display data to said display means;

storage means coupled to said processing means for storing data and instructions;

editing means connected to said input means and said processor means for receiving editing instructions from the user and for editing the expression elements and equations displayed on said display means; and equation construction means for constructing equations from said expression elements by setting a particular expression element equal to itself if the user fails to enter a full equation.

44. The apparatus of claim 43 further comprising first maintenance means for manipulating a first set of equations such that said first maintenance means maintains consistency in truth among said first set of equations by preventing any of said equations in said first set from being mathematically inconsistent with any other of said equations in said first set.

45. The apparatus of claim 44 further comprising second maintenance means for manipulating a second set of equations such that said second maintenance means maintains consistency in truth between said second set of equations wherein said first set of equations and said second set of equations are inconsistent with respect to each other.

46. The apparatus of claim 45 further comprising segregation means for displaying said first and second set of equations on said display means in segregated form such that said first set of equations are enclosed in a first area and said second set of equations are enclosed in a second area.

47. The apparatus of claim 43 further comprising multiple result means for displaying on said display means a multiplicity of resulting equations in response to a manipulation on a constructed equation which provides more than one possible result.

48. The apparatus of claim 43 further comprising interpretation means for interpreting the expression elements and equations and providing a graphic illustration of a result on said display means.

49. The apparatus of claim 43 further comprising outlining means for arranging the expression elements and equations in an outline form.

50. The apparatus of claim 49 wherein said outline form is arranged such that equations which are the result of manipulation of a previously existing equation are indented so as to be subordinate to said previously existing equation.

51. The apparatus of claim 43 further comprising selection means for selecting a plurality of expression elements or equations, wherein at least some of said plurality of expression elements or equations are not identical, and for performing editing and manipulations on each of said plurality of expression elements or equations substantially simultaneously.

52. The apparatus of claim 51 wherein said plurality of expression elements are matrix elements.

53. The apparatus of claim 43 wherein said processing means further comprises balance modification means for altering an equation by modifying at least two locations substantially simultaneously to maintain consistency in truth of an altered quation.

54. The apparatus of claim 43 wherein said pointing means further comprises movement means for depicting movement of said particular expression elements and equations on said display means.

55. The apparatus of claim 54 wherein said movement means depicts movement of said particular expression elements from a first side of an equation to a second side of said equation.

56. The apparatus of claim 43 further comprising isolation means for isolating a subexpression element in an equation and performing a manipulation to isolate said subexpression on a first side of said equation in accordance with the conventional rules of mathematics.

57. The apparatus of claim 43 further comprising global substitution means for targeting said multiplicity of resulting equations and substituting substantially simultaneously for a particular expression data in each of said multiplicity of resulting equations a predefined mathematical expression.

58. The apparatus of claim 43 further comprising:
rule storage means for storing a plurality of rules; and
transformation means for transforming a particular expression in accordance with one of said plurality of rules.

59. The apparatus of claim 43 further comprising substitution means for substituting a first set of expression elements defined as being equal to a second set of expression elements identified by said pointing means into a target equation.

60. The apparatus of claim 43 further comprising parentheses means for recognizing various parentheses styles input by the user and converting recognized parentheses in accordance with a preselected parentheses standard defined within software on the computer, and wherein said generating means generates display data containing various parenthesis styles in accordance with a preselected parenthesis display standard.

61. The apparatus of claim 60 wherein said parentheses means equates said various parentheses styles input by the user.

62. The apparatus of claim 43 further comprising collapsing means for displaying particular expression data and equations in a collapsed form on said display means.

63. The apparatus of claim 62 wherein said collapsed form displays a plurality of said expression data and equations via an indicator on said display means representing an expanded form of said expression data or equations.

64. The apparatus of claim 63 further comprises expansion means for expanding a particular data expression or equation wherein the user locates said pointing means on a particular indicator and provides an instruction to expand said particular indicator.

* * * * *